United States Patent
Aiken, Jr. et al.

(10) Patent No.: US 6,996,631 B1
(45) Date of Patent: Feb. 7, 2006

(54) SYSTEM HAVING A SINGLE IP ADDRESS ASSOCIATED WITH COMMUNICATION PROTOCOL STACKS IN A CLUSTER OF PROCESSING SYSTEMS

(75) Inventors: John Andrew Aiken, Jr., Raleigh, NC (US); Alfred Bundgaard Christensen, Raleigh, NC (US); Wesley McMillan Devine, Apex, NC (US); David Anthony Herr, Apex, NC (US); Mark W. McClintock, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 09/640,409

(22) Filed: Aug. 17, 2000

(51) Int. Cl.
*G06F 15/173* (2006.01)

(52) U.S. Cl. .................. 709/242; 709/238; 709/239; 709/220

(58) Field of Classification Search .............. 709/242, 709/238, 239, 220, 224, 201; 714/15; 370/401
See application file for complete search history.

(56) References Cited

U.S. PATENT DOCUMENTS

| | | | | |
|---|---|---|---|---|
| 4,403,286 | A | 9/1983 | Fry et al. | 364/200 |
| 4,495,570 | A | 1/1985 | Kitajima et al. | 364/200 |
| 4,577,272 | A | 3/1986 | Ballew et al. | 364/200 |

(Continued)

FOREIGN PATENT DOCUMENTS

EP  0648038 A2  8/1994

OTHER PUBLICATIONS

U.S. Appl. No. 09/693,663, filed Oct. 20, 2000.
U.S. Appl. No. 09/693,027, filed Oct. 20, 2000.
U.S. Appl. No. 09/640,438, filed Aug. 17, 2000.
U.S. Appl. No. 09/640,412, filed Aug. 17, 2000.
A. Dahlin, et al. *EDDIE A Robust and Scalable Internet Server.* Ericsson Telecom AB, Stockholm, Sweden (May 1998).

*Primary Examiner*—Le Hien Luu
(74) *Attorney, Agent, or Firm*—Myers Bigel Sibley & Sajovec

(57) ABSTRACT

Methods, systems and computer program products provide communications with a plurality of application instances using a plurality of communication protocol stacks and a single Internet Protocol (IP) address. A stack is established as a routing stack associated with the single IP address. Other stacks which are associated with the single IP address are defined as candidate target stacks and an identification of candidate target stacks and the routing stack is distributed to the stacks. The routing stack is notified when an application associated with a candidate target stack listens to a port of the IP address to establish a current actual target stack. A request to establish a connection to the IP address and the port of the IP address is received and a routing table entry corresponding to the current actual target stack is created to provide a routing path from the routing stack to the current actual target stack. Communications to the port of the IP address received by the routing stack are routed based on the routing table.

36 Claims, 12 Drawing Sheets

U.S. PATENT DOCUMENTS

| | | | |
|---|---|---|---|
| 5,031,089 A | 7/1991 | Liu et al. | 364/200 |
| 5,341,477 A | 8/1994 | Pitkin et al. | 395/200 |
| 5,537,542 A | 7/1996 | Eilert et al. | 395/184.01 |
| 5,563,878 A | 10/1996 | Blakeley et al. | 370/60 |
| 5,603,029 A | 2/1997 | Aman et al. | 395/675 |
| 5,675,739 A | 10/1997 | Eilert et al. | 395/200 |
| 5,740,371 A | 4/1998 | Wallis | 395/200.59 |
| 5,754,752 A | 5/1998 | Sheh et al. | 395/182.02 |
| 5,774,660 A | 6/1998 | Brendel et al. | 395/200.31 |
| 5,774,668 A | 6/1998 | Choquier et al. | 395/200.53 |
| 5,796,936 A | 8/1998 | Watabe et al. | 395/182.09 |
| 5,812,771 A * | 9/1998 | Fee et al. | 709/201 |
| 5,828,847 A | 10/1998 | Gehr | 395/200.69 |
| 5,867,636 A | 2/1999 | Walker | 395/114 |
| 5,867,661 A | 2/1999 | Bittinger et al. | 709/227 |
| 5,917,997 A | 6/1999 | Bell et al. | 395/182.02 |
| 5,918,017 A * | 6/1999 | Attanasio et al. | 709/224 |
| 5,923,854 A | 7/1999 | Bell et al. | 395/200.73 |
| 5,935,215 A | 8/1999 | Bell et al. | 709/239 |
| 5,941,988 A | 8/1999 | Bhagwat et al. | 713/201 |
| 5,946,686 A | 8/1999 | Schmuck et al. | 707/10 |
| 5,951,650 A | 9/1999 | Bell et al. | 709/238 |
| 5,951,694 A | 9/1999 | Choquier et al. | 714/15 |
| 6,031,978 A | 2/2000 | Cotner et al. | 395/200.78 |
| 6,119,174 A | 9/2000 | Borowsky et al. | 710/15 |
| 6,128,279 A | 10/2000 | O'Neil et al. | 370/229 |
| 6,141,759 A | 10/2000 | Braddy | 713/201 |
| 6,247,057 B1 | 1/2001 | Barrera, III | 709/229 |
| 6,223,205 B1 | 4/2001 | Harchol-Balter et al. | 709/105 |
| 6,252,878 B1 | 6/2001 | Locklear, Jr. et al. | 370/401 |
| 6,286,039 B1 | 9/2001 | Van Horne et al. | 709/221 |
| 6,314,463 B1 | 11/2001 | Abbott et al. | 709/224 |
| 6,317,786 B1 | 11/2001 | Yamane et al. | 709/224 |
| 6,330,560 B1 | 12/2001 | Harrison et al. | 707/8 |
| 6,363,081 B1 | 3/2002 | Gase | 370/466 |
| 6,374,300 B2 | 4/2002 | Masters | 709/202 |
| 6,430,622 B1 | 8/2002 | Aiken, Jr. et al. | 709/245 |
| 6,445,704 B1 | 9/2002 | Howes et al. | 370/392 |
| 6,446,225 B1 | 9/2002 | Robsman et al. | 714/55 |
| 6,542,926 B2 | 4/2003 | Zalewski et al. | 709/213 |
| 6,578,066 B1 | 6/2003 | Logan et al. | 709/105 |
| 6,587,866 B1 | 7/2003 | Modi et al. | 709/105 |
| 6,591,262 B1 | 7/2003 | Maclellan et al. | 707/2 |
| 6,594,268 B1 | 7/2003 | Aukia et al. | 370/400 |
| 6,606,315 B1 | 8/2003 | Albert et al. | 370/352 |
| 6,650,641 B1 | 11/2003 | Albert et al. | 370/392 |
| 6,657,974 B1 | 12/2003 | Britton et al. | 370/216 |
| 6,701,377 B2 | 3/2004 | Burmann et al. | 709/249 |
| 6,704,317 B1 * | 3/2004 | Dobson | 370/401 |
| 6,718,383 B1 | 4/2004 | Hebert | 709/224 |
| 2002/0010783 A1 | 1/2002 | Primak et al. | 709/228 |
| 2002/0091831 A1 | 7/2002 | Johnson | 709/227 |
| 2002/0124089 A1 | 9/2002 | Aiken, Jr. et al. | 709/227 |
| 2002/0143953 A1 | 10/2002 | Aiken, Jr. et al. | 709/227 |
| 2002/0143954 A1 | 10/2002 | Aiken, Jr. et al. | 709/227 |
| 2002/0166080 A1 * | 11/2002 | Attanasio et al. | 714/15 |
| 2002/0178265 A1 | 11/2002 | Aiken, Jr. et al. | 709/227 |
| 2002/0178268 A1 | 11/2002 | Aiken, Jr. et al. | 709/227 |
| 2002/0199000 A1 | 12/2002 | Banerjee | 709/227 |
| 2003/0061402 A1 | 3/2003 | Yadav | 709/328 |
| 2003/0079146 A1 | 4/2003 | Burstein | 713/201 |
| 2003/0202536 A1 | 10/2003 | Foster et al. | 370/469 |

OTHER PUBLICATIONS

Brochure entitled, *ACEdirector™ 8–Port 10/100 MBPS Ethernet Switch.* Alteon WebSystems, San Jose, CA (1999).

Brochure entitled, *Enhancing Web User Experience with Global Server Load Balancing.* Alteon WebSystems, San Jose, CA (Jun. 1999).

Brochure entitled, *The Next Step in Server Load Balancing.* Alteon WebSystems, San Jose, CA (Nov. 1999).

Mac Devine. Presentation entitled, *TCP/IP Application Availability and Workload Balancing in the Parallel Sysplex.* Share Technical Conference (Aug. 22–27, 1999).

http://w3.enterlib.ibm.com:80/cgi–bin/bookmgr/books/ F1AF7001/1.3.1.2; 1.3.1.2.5 Virtual IP Addressing (VIPA); Excerpt from IP Configuration for OS/390, pp. 1–4 (1998).

http://w3.enterlib.ibm.com:80/cgi–bin/bookmgr/books/ F1AF7001/1.3.2; 1.3.20 DEVICE and LINK Statement— Virtual Devices (VIPA); Excerpt from IP Configuration for OS/390, pp. 1–3 (1998).

http://w3.enterlib.ibm.com:80/cgi–bin/bookmgr/books/ F1AF7001/1.3.2; 1.3.23. HOME Statement; Excerpt from IP Configuration for OS/390, pp. 1–6 (1998).

Pai et al. *Locality–Aware Request Distribution in Cluster-based Network Servers.* Proceedings of the 8th International Conference on Architectural Support for Programming Languages and Operating Systems (ASPLOS VIII), San Jose, CA, Oct. 1998.

Aron et al., "Scalable Content–aware Request Distribution in Cluster–based Network Servers." Proc. of the 2000 Annual Usenix Technical Conference, San Diego, CA, Jun. 2000.

Aron et al. "Efficient Support for P–HTTP in Cluster–Based Web Servers." Proc. of 1999 Annual Usenix Technical Conference, Monterey, CA, Jun. 1999.

Aron, Mohit. "Scalable Content–aware Request Distribution in Cluster–based Network Servers." http://softlib.rice.edu/softlib/scalableRD.html. Department of Computer Science, Rice University.

"Data Communications Awards Allot Communications 'Hot Product' in Internetworking/IP Tools Category." Press Bulletin. Los Gatos, CA, Jan. 18, 1999.

"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.

"Allot Announces the General Availability of its Directory Services–Based NetPolicy™ Manager." Press Bulletin, Tel Aviv, Israel, Feb. 28, 2000.

"Allot Communications Announces the Netenforcer Family of IP Traffic Management Products: Fault–Tolerant, Scaleable, Policy–Based Bandwidth Management, QOS, SLA Solutions." Press Bulletin. Burlingame, CA, Dec. 13, 1999.

"Allot Communications Announces Business–Aware Network Policy Manager." Press Bulletin. Sophia Antipolis, France, Sep. 20, 1999.

"Allot Communications Announces Directory Services Based Network Policy Manager." Press Bulletin. Los Gatos, CA, Apr. 5, 1999.

"Allot Communications Launches NetEnforcer with NetWizard, the Fastest Way to Implement Accurate and Reliable Network QoS Policies." Press Bulletin. Burlingame, CA, Jan. 25, 2001.

"Policy–Based Network Architecture." from www.allot.com pp. 1–11.

* cited by examiner

SYSTEM HAVING A SINGLE IP ADDRESS ASSOCIATED WITH COMMUNICATION PROTOCOL STACKS IN A CLUSTER OF PROCESSING SYSTEMS

RELATED APPLICATIONS

The present application is related to concurrently filed and commonly assigned U.S. patent application Ser. No. 09/640,412 now pending, entitled "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS" and U.S. patent application Ser. No. 09/640,438 now pending, entitled "METHODS, SYSTEMS AND COMPUTER PROGRAM PRODUCTS FOR FAILURE RECOVERY FOR ROUTED VIRTUAL INTERNET PROTOCOL ADDRESSES" the disclosures of which are incorporated herein by reference as if set forth fully herein.

FIELD OF THE INVENTION

The present invention relates to network communications and more particularly to network communications to a cluster of data processing systems.

BACKGROUND OF THE INVENTION

The Internet Protocol (IP) is a connectionless protocol. IP packets are routed from originator through a network of routers to the destination. All physical adapter devices in such a network, including those for client and server hosts, are identified by an IP Address which is unique within the network. One valuable feature of IP is that a failure of an intermediate router node or adapter will not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter fail, and must be reestablished. If the failure is on a client workstation host, only the relatively few client connections are disrupted, and usually only one person is inconvenienced. However, an adapter failure on a server means that hundreds or thousands of connections may be disrupted. On a System/390 with large capacity, the number may run to tens of thousands.

To alleviate this situation, International Business Machines Corporation introduced the concept of a Virtual IP Address, or VIPA, on its TCP/IP for OS/390 V2R5 (and added to V2R4 as well). Examples of VIPAs and their user may be found in U.S. Pat. Nos. 5,917,997, 5,923,854, 5,935,215 and 5,951,650. A VIPA is configured the same as a normal IP address for a physical adapter, except that it is not associated with any particular device. To an attached router, the TCP/IP stack on System/390 simply looks like another router. When the TCP/IP stack receives a packet destined for one of its VIPAs, the inbound IP function of the TCP/IP stack notes that the IP address of the packet is in the TCP/IP stack's Home list of IP addresses and forwards the packet up the TCP/IP stack. The "home list" of a TCP/IP stack is the list of IP addresses which are "owned" by the TCP/IP stack. Assuming the TCP/IP stack has multiple adapters or paths to it (including a Cross Coupling Facility (XCF) path from other TCP/IP stacks in a Sysplex), if a particular physical adapter fails, the attached routing network will route VIPA-targeted packets to the TCP/IP stack via an alternate route. The VIPA may, thus, be thought of as an address to the stack, and not to any particular adapter.

While the use of VIPAs may remove hardware and associated transmission media as a single point of failure for large numbers of connections, the connectivity of a server can still be lost through a failure of a single stack or an MVS image. The VIPA Configuration manual for System/390 tells the customer how to configure the VIPA(s) for a failed stack on another stack, but this is a manual process. Substantial down time of a failed MVS image or TCP/IP stack may still result until operator intervention to manually reconfigure the TCP/IP stacks in a Sysplex to route around the failed TCP/IP stack or MVS image.

While merely restarting an application with a new IP address may resolve many failures, applications use IP addresses in different ways and, therefore, such a solution may be inappropriate. The first time a client resolves a name in its local domain, the local Dynamic Name Server (DNS) will query back through the DNS hierarchy to get to the authoritative server. For a Sysplex, the authoritative server should be DNS/Workload Manager (WLM). DNS/WLM will consider relative workloads among the nodes supporting the requested application, and will return the IP address for the most appropriate available server. IP addresses for servers that are not available will not be returned. The Time to Live of the returned IP address will be zero, so that the next resolution query (on failure of the original server, for example) will go all the way back to the DNS/WLM that has the knowledge to return the IP address of an available server.

However, in practice, things do not always work as described above. For example, some clients are configured to a specific IP address, thus requiring human intervention to go to another server. However, the person using the client may not have the knowledge to reconfigure the client for a new IP address. Additionally, some clients ignore the Time to Live, and cache the IP address as long as the client is active. Human intervention may again be required to recycle the client to obtain a new IP address. Also, DNSs are often deployed as a hierarchy to reduce network traffic, and DNSs may cache the IP address beyond the stated Time to Live even when the client behaves quite correctly. Thus, even if the client requests a new IP address, the client may receive the cached address from the DNS. Finally, some users may prefer to configure DNS/WLM to send a Time to Live that is greater than zero, in an attempt to limit network-wide traffic to resolve names. Problems arising from these various scenarios may be reduced if the IP address with which the client communicates does not change. However, as described above, to affect such a movement of VIPAs between TCP/IP stacks requires operator intervention and may result in lengthy down times for the applications associated with the VIPA.

Previous approaches to increased availability focused on providing spare hardware. The High-Availability Coupled Multi-Processor (HACMP) design allows for taking over the MAC address of a failing adapter on a shared medium (LAN). This works both for a failing adapter (failover to a spare adapter on the same node) or for a failing node (failover to another node via spare adapter or adapters on the takeover node.) Spare adapters are not used for IP traffic, but they are used to exchange heartbeats among cluster nodes for failure detection. All of the work on a failing node goes to a single surviving node. In addition to spare adapters and access to the same application data, the designated failover node must also have sufficient spare processing capacity to handle the entire failing node workload with "acceptable" service characteristics (response and throughput).

Automatic restart of failing applications also provides faster recovery of a failing application or node. This may be acceptable when the application can be restarted in place, but is less useful when the application is moved to another node, unless the IP address known to the clients can be moved with the application, or dynamic DNS updates with alternate IP addresses can be propagated to a DNS local to clients sufficiently quickly.

Other attempts at error recovery have included the EDDIE system described in a paper titled "EDDIE, A Robust and Scalable Internet Server" by A. Dahlin, M. Froberg, J. Grebeno, J. Walerud, and P. Winroth, of Ericsson Telecom AB, Stockholm, Sweden, May 1998. In the EDDIE approach a distributed application called "IP Address Migration Application" controls all IP addresses in the cluster. The cluster is connected via a shared-medium LAN. IP address aliasing is used to provide addresses to individual applications over a single adapter, and these aliases are located via Address Resolution Protocol (ARP) and ARP caches in the TCP/IPs. The application monitors all server applications and hardware, and reallocates aliased IP addresses in the event of failure to surviving adapters and nodes. This approach allows applications of a failing node to be distributed among surviving nodes, but it may require the monitoring application to have complete knowledge of the application and network adapter topology in the cluster. In this sense, it is similar to existing Systems Management applications such as those provided by International Business Machines Corporation's Tivoli® network management software, but the IP Address Migration Application has direct access to adapters and ARP caches. The application also requires a dedicated IP address for inter-application communication and coordination.

U.S. patent application Ser. No. 09/401,419, U.S. Pat. No. 6,630,615, entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosure of which is incorporated herein by reference as if set forth fully herein, describes dynamic virtual IP addresses (VIPA) and their use. As described in the '419 application, a dynamic VIPA may be automatically moved from protocol stack to protocol stack in a predefined manner to overcome failures of a particular protocol stack (i.e. VIPA takeover). Such a predefined movement may provide a predefined backup protocol stack for a particular VIPA. VIPA takeover was made available by International Business Machines Corporation (IBM), Armonk, N.Y., in System/390 V2R8 which had a general availability date of September, 1999.

In addition to failure scenarios, scalability and load balancing are also issues which have received considerable attention in light of the expansion of the Internet. For example, it may be desirable to have multiple servers servicing customers. The workload of such servers may be balanced by providing a single network visible IP address which is mapped to multiple servers.

Such a mapping process may be achieved by, for example, network address translation (NAT) facilities, dispatcher systems and IBM's Dynamic Name Server/Workload Management DNS/WLM systems. These various mechanisms for allowing multiple servers to share a single IP address are illustrated in FIGS. 1 through 3.

FIG. 1 illustrates a conventional network address translation system as described above. In the system of FIG. 1, a client 10 communicates over a network 12 to a network address translation system 14. The network address translation system receives the communications from the client 10 and converts the communications from the addressing scheme of the network 12 to the addressing scheme of the network 121 and sends the messages to the servers 16. A server 16 may be selected from multiple servers 16 at connect time and may be on any host, one or more hops away. All inbound and outbound traffic flows through the NAT system 14.

FIG. 2 illustrates a conventional DNS/WLM system as described above. As mentioned above, the server 16 is selected at name resolution time when the client 10 resolves the name for the destination server from DNS/WLM system 17 which is connected to the servers 16 through the coupling facility 19. As described above, the DNS/WLM system of FIG. 2 relies on the client 10 adhering to the zero time to live.

FIG. 3 illustrates a conventional dispatcher system. As seen in FIG. 3, the client 10 communicates over the network 12 with a dispatcher system 18 to establish a connection. The dispatcher routes inbound packets to the servers 16 and outbound packets are sent over network 12' but may flow over any available path to the client 10. The servers 16 are typically on a directly connected network to the dispatcher 18 and a server 16 is selected at connect time.

Such a dispatcher system is illustrated by the Interactive Network Dispatcher function of the IBM 2216 and AIX platforms. In these systems, the same IP address that the Network Dispatcher node 18 advertises to the routing network 12 is activated on server nodes 16 as loopback addresses. The node performing the distribution function connects to the endpoint stack via a single hop connection because normal routing protocols typically cannot be used to get a connection request from the endpoint to the distributing node if the endpoint uses the same IP address as the distributing node advertises. Network Dispatcher uses an application on the server to query a workload management function (such as WLM of System/390), and collects this information at intervals, e.g. 30 seconds or so. Applications running on the Network Dispatcher node can also issue "null" queries to selected application server instances as a means of determining server instance health.

In addition to the above described systems, Cisco Systems offers a Multi-Node Load Balancing function on certain of its routers that perform the distribution function. Such operations appear similar to those of the IBM 2216.

Finally, in addition to the system described above, Ace-Director from Alteon provides a virtual IP address and performs network address translation to a real address of a selected server application. AceDirector appears to observe connection request turnaround times and rejection as a mechanism for determining server load capabilities.

SUMMARY OF THE INVENTION

Methods, systems and computer program products according to embodiments of the present invention provide communications with a plurality of application instances executing on a cluster of data processing systems having a plurality of communication protocol stacks associated therewith utilizing a single Internet Protocol (IP) address. A first of the plurality of communication protocol stacks is established as a routing communication protocol stack associated with the single IP address. Ones of the plurality of communication protocol stacks which are associated with the single IP address are defined as candidate target protocol stacks and an identification of candidate target protocol stacks and the routing communication protocol stack is distributed to the communication protocol stacks. The routing communication protocol stack is notified when an instance of the plurality of application instances associated with a candidate target communication protocol stack listens to a port of the single IP address to establish a current actual target stack. A request to establish a connection to the single IP address and the port of the single IP address is received and a routing table entry corresponding to the current actual target stack is created to provide a routing path associated with the IP address and the port from the routing communication protocol stack to the current actual target stack. Communications to the port of the IP address received by the routing communication protocol stack are routed based on the routing table.

In further embodiments of the present invention, all of the plurality of communication protocol stacks of the cluster of data processing systems are defined as associated with the single IP address. Alternatively, enumerated ones of the plurality of communication protocol stacks of the cluster of data processing systems may be defined as associated with the single IP address.

In still further embodiments of the present invention, a first of the plurality of communication protocol stacks is established as a routing communication protocol stack associated with the single IP address for routing communications associated with at least one specified port associated with the IP address. Ones of the plurality of communication protocol stacks which are associated with the at least one specified port associated with the IP address are defined as candidate target communication protocol stacks and an identification of the candidate target protocol stacks and the routing communication protocol stack distributed to the plurality of communication protocol stacks. The routing communication protocol stack is notified when an instance of the plurality of application instances associated with a candidate target communication protocol stack listens to the at least one port of the single IP address.

In such embodiments, the at least one port may be a plurality of ports identified in a port list associated with the single IP address. Furthermore, the least one port may be all ports associated with the single IP address.

In additional embodiments, the first communication protocol stack is notified that the instance of the plurality of application instances associated with a candidate target communication protocol stack has terminated listening to the port of the single IP address. In such a case, the routing table entry corresponding to the candidate target communication protocol stack may be removed so as to remove the routing path associated with the IP address, the port and the candidate target communication protocol stack. Such notification may be provided by sending a termination message through a cross coupling facility of the cluster of data processing systems.

In still further embodiments of the present invention, the routing communication protocol stack is established and the plurality of communication protocol stacks defined by incorporating a VIPADISTribute statement in a VIPADynamic definition block associated with the first communication protocol stack. The VIPADISTribute statement defines a IP address as a dynamic routable virtual IP address (VIPA), identifies ports associated with the VIPA which are routable, and identifies communication protocols stacks associated with the VIPA. In such embodiments, the distribution of an identification of protocol stacks which are associated with the single IP address and an identification of the first of the plurality of communication protocol stacks may be accomplished by broadcasting a list including the definitions of the VIPADISTRibute statement.

In still further embodiments of the present invention, the routing communication protocol stack is notified that a connection utilizing the single IP address and the port of the singe IP address has terminated. The routing table entry corresponding to the connection to the candidate target communication protocol stack associated with the connection is then removed so as to remove the routing path associated with the IP address, the port and the second communication protocol stack.

Furthermore, when a connection request is received by the routing communication protocol stack, one of the communication protocol stacks identified as having an application instance bound to the single IP address and listening to the port associated with the request is selected. The routing path may then be incorporated in the routing table for the selected communication protocol stack.

In further embodiments of the present invention, systems, methods and computer program products are provided for communicating with a plurality of application instances executing on a cluster of data processing systems having a plurality of communication protocol stacks associated therewith utilizing a single IP address may be provided by a routing communication protocol stack configured to receive communications to the single IP address and to forward to the received communications to a selected communication protocol stack from the plurality of communication protocol stacks. A destination port table associated with the routing communication protocol stack which identifies communication protocol stacks having application instances bound to the single IP address and listening to a predefined port of the single IP address. A current routing table associated with the routing communication protocol stack which identifies routing paths from the routing communication protocol stack to a communication protocol stack associated with a connection utilizing the single IP address and the predefined port.

In further embodiments, the routing communication protocol stack is further configured to build the destination port table based on status messages received from communication protocol stacks of the plurality of communication protocol stacks having application instances bound to the single IP address and listening to a predefined port of the single IP address in response to distribution by the routing communication protocol stack of an identification of the single IP address and the predefined port as a routable IP address. Furthermore, the routing communication protocol stack may be further configured to incorporate into the current routing table routing paths associated with new connection messages received by the routing communication protocol stack from communication protocol stacks which initiate connections utilizing the single IP address and the predefined port as a source address.

In yet additional embodiments of the present invention, the routing communication protocol stack is further configured to receive requests for connections to the single IP address and the predefined port, select communication protocol stacks for the connections from the destination port table and update the current routing table with path information associated with the connections and the selected communication protocol stacks. The routing communication protocol stack may also be further configured to receive connection termination messages from communication protocol stacks which detect termination of connections utilizing the single IP address and predefined port and to update the current routing table to remove routing paths associated with the terminated connections.

The predefined port may be a plurality of predefined ports identified in a port list associated with the single IP address or the predefined port may be all ports associated with the single IP address.

As will further be appreciated by those of skill in the art, the present invention may be embodied as methods, apparatus/systems and/or computer program products.

DETAILED DESCRIPTION OF THE INVENTION

Figure 1:
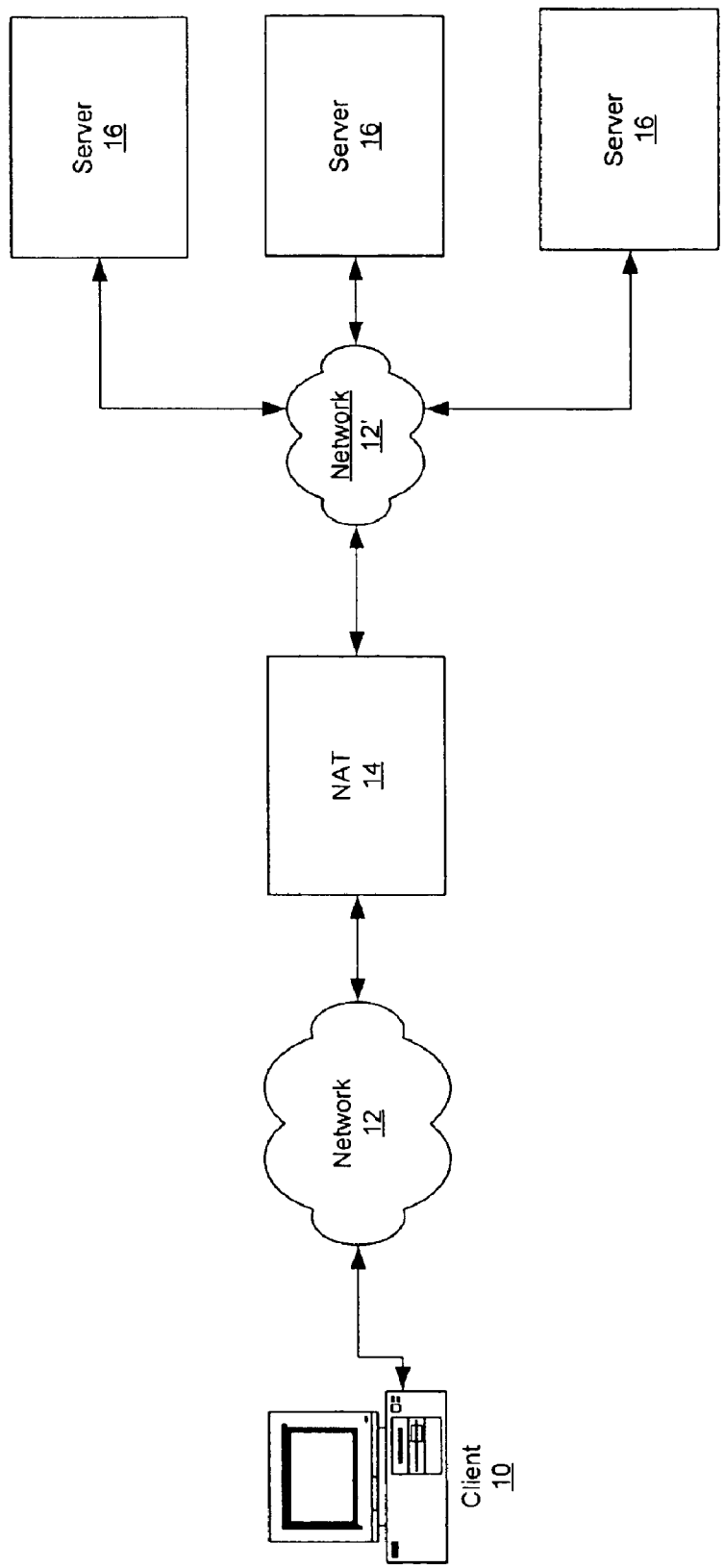
FIG. 1 is block diagram of a conventional network address translation system.
Figure 2:
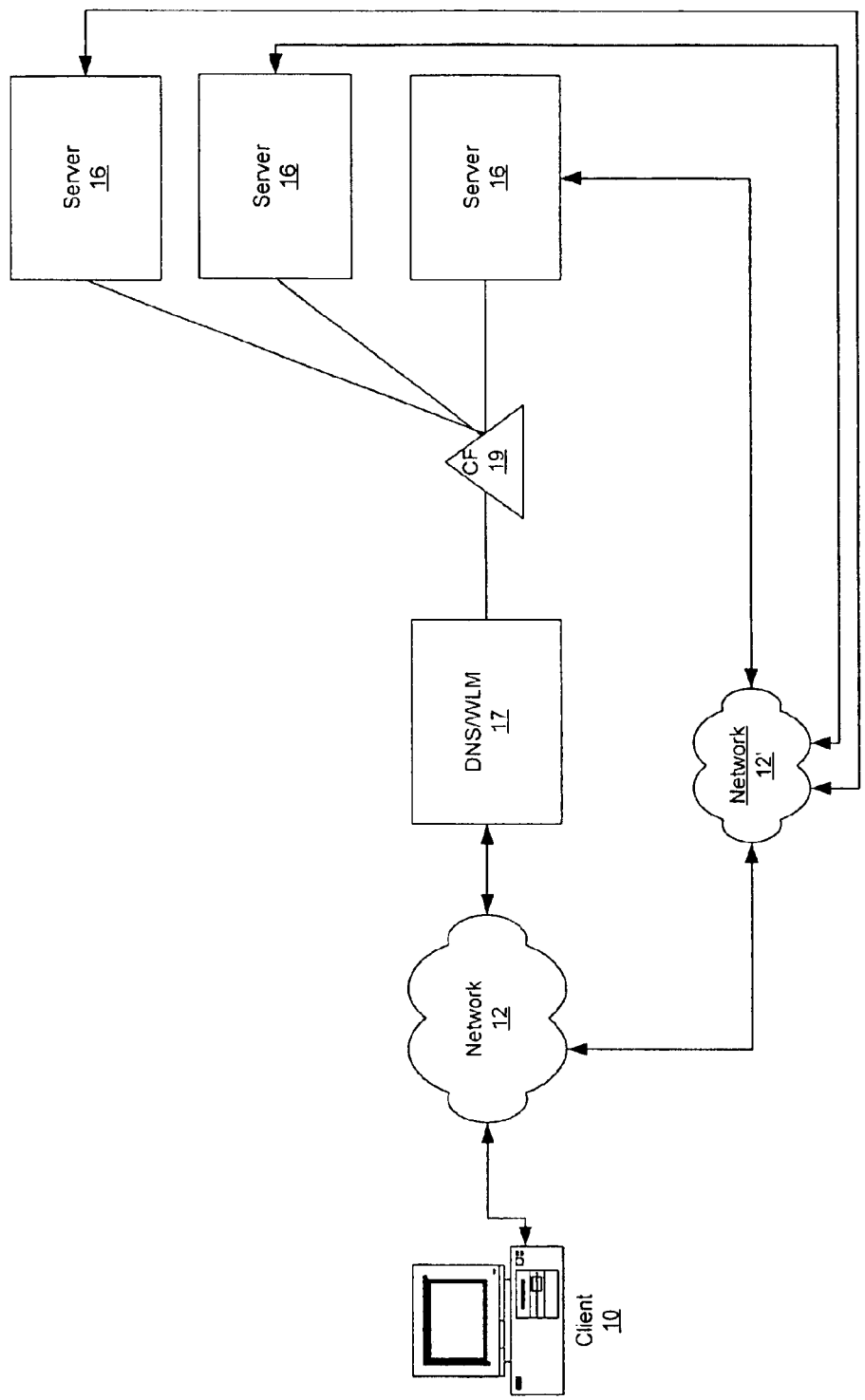
FIG. 2 is block diagram of a conventional DNS/WLM system.
Figure 3:
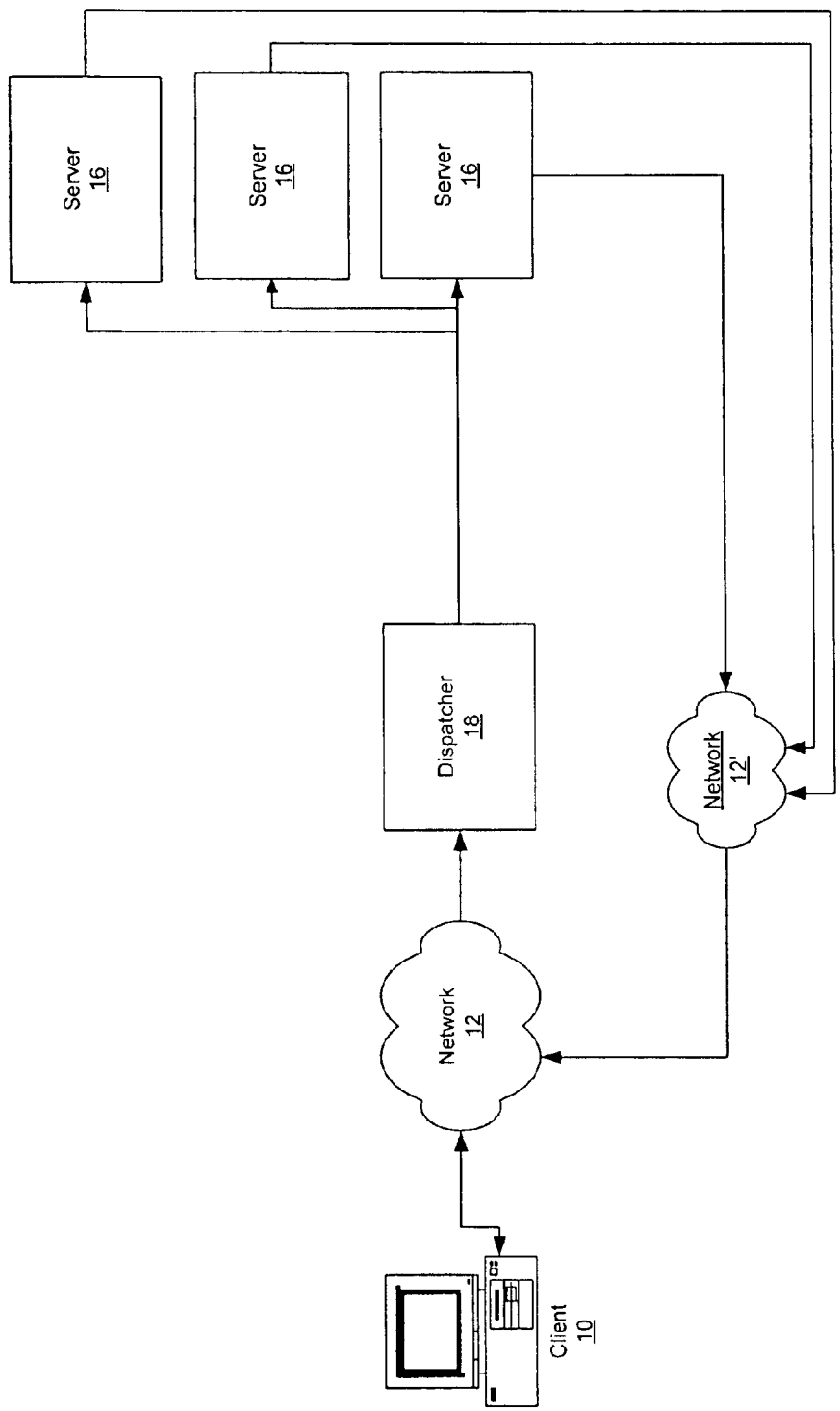
FIG. 3 is block diagram of a conventional dispatcher system.

The present invention now will-be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device. The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The present invention can be embodied as systems, methods, or computer program products which allow for a single IP address being associated with a plurality of communication protocol stacks in a cluster of data processing systems by providing a routing protocol stack which associates a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs" (DVIPA). While the present invention is described with reference to a specific embodiment in a System/390 Sysplex, as will be appreciated by those of skill in the art, the present invention may be utilized in other systems where clusters of computers utilize virtual addresses by associating an application or application group rather than a particular communications adapter with the addresses. Thus, the present invention should not be construed as limited to the particular exemplary embodiment described herein.

Figure 4:
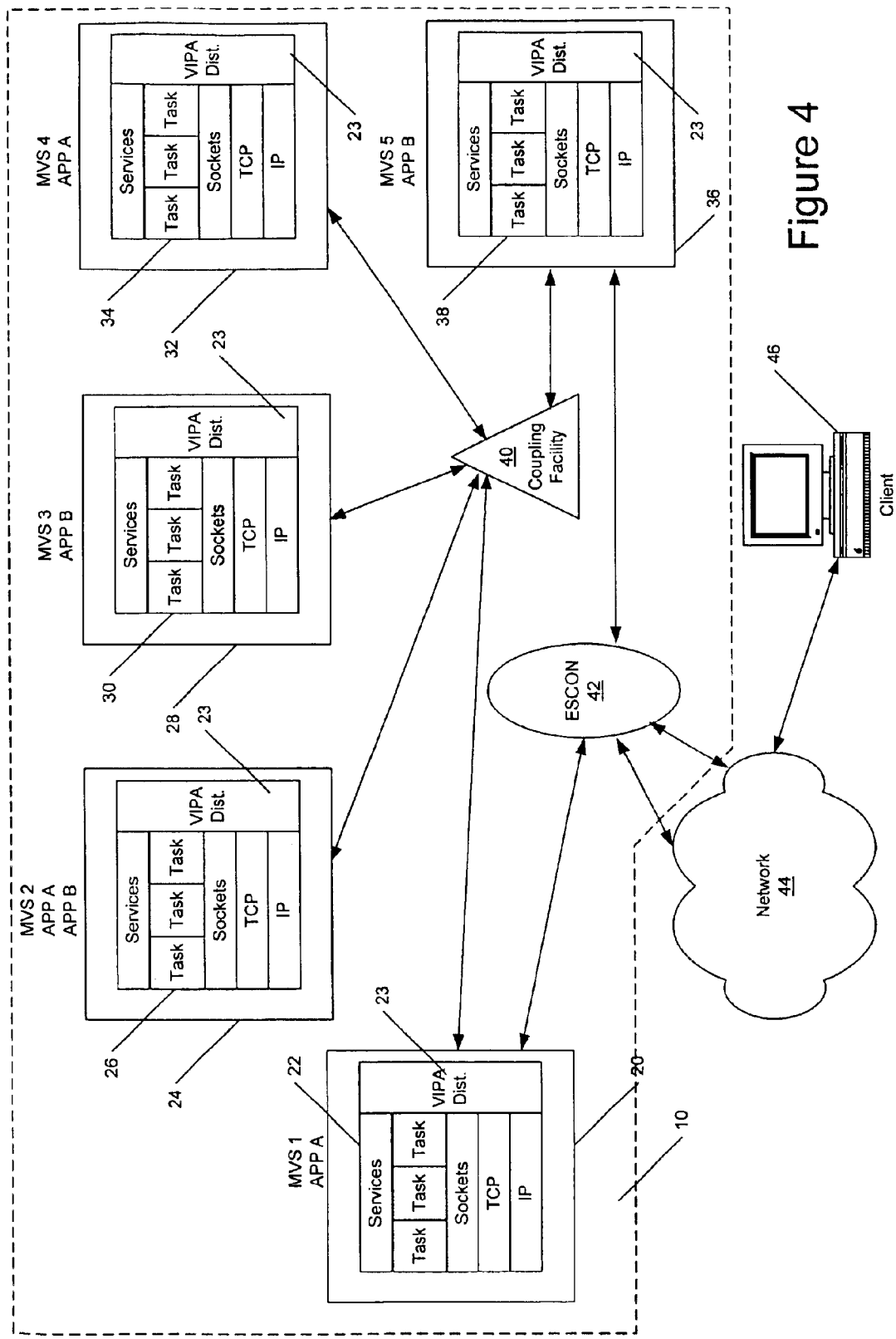
FIG. 4 is block diagram of a cluster of data processing systems incorporating embodiments of the present invention.

A cluster of data processing systems is illustrated in FIG. 4 as a cluster nodes in Sysplex 10. As seen in FIG. 4, several data processing systems 20, 24, 28, 32 and 36 are interconnected in a Sysplex 10. The data processing systems 20, 24, 28, 32 and 36 illustrated in FIG. 4 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting dynamic routable Virtual IP Addresses and which are capable of error recovery as described herein.

As is further illustrated in FIG. 4, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 have been modified to incorporate a VIPA distribution function 23 as described herein for providing dynamic routable VIPAs so as to provide a single IP address for multiple communication protocol stacks.

While each of the communication protocol stacks 22, 26, 30, 34 and 38 illustrated in FIG. 4 incorporate the VIPA distribution function 23, not all communication protocol stacks in a Sysplex need incorporate the VIPA distribution function 23. Thus, the present invention may be carried out on any system where two or more communication protocol stacks in a cluster of data processing systems support dynamic routable VIPAs. If a communication protocol stack does not support dynamic routable VIPA, then the dynamic routable VIPA messages according to the present invention would be ignored by the communication protocol stack. Thus, the present invention provides backward compatibility with existing communication protocol stacks.

As is further seen in FIG. 4, the communication protocol stacks 22, 26, 30, 34 and 38 may communicate with each other through a coupling facility 40 of the Sysplex 10, for example, utilizing XCF messaging.

Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize network 44 to communicate with an application executing on an MVS image in Sysplex 10 through the communication protocol stacks 22 and 38 which may function as routing protocol stacks as described herein.

As is further illustrated in FIG. 4, as an example of utilization of the present invention and for illustration purposes, data processing system 20 has associated with it communication protocol stack 22 which is associated with MVS image MVS 1 which has application APP A executing on MVS image MVS 1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS 3 which has a second instance of application APP B executing on MVS image MVS 3 which may utilize communication protocol stack 30 for communications. Data processing system 32 has associated with it communication protocol stack 34 which is associated with MVS image MVS 4 which has a third instance of application APP A executing on MVS image MVS 4 which may utilize communication protocol stack 34 for communications. Finally, data processing system 36 has associated with it communication protocol stack 38 which is associated with MVS image MVS 5 which has a third instance of application APP B executing on MVS image MVS 5 which may utilize communication protocol stack 38 for communications.

Utilizing the above described system configuration as an example, the VIPA distribution function 23 will now be described. The VIPA distribution function 23 allows for protocol stacks which are defined as supporting DVIPAs to share the DVIPA and communicate with network 44 through a routing protocol stack such that all protocol stacks having a server application which is associated with the DVIPA will appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA is started. Because communications to the DVIPA are routed through the routing protocol stack, the routing protocol stack may provide work load balancing by distributing connections to the other protocol stacks on MVS images executing server applications which bind to the DVIPA to balance workload. Furthermore, in particular embodiments of the present invention, scalability and availability may be provided by allowing all protocol stacks for MVS images which execute applications which bind to the DVIPA to have communications routed through the routing protocol stack without user intervention to establish the routing path.

Further aspects of the VIPA distribution function 23 according to embodiments of the present invention allow automated movement of a routing protocol function to a backup stack. Another aspect of the VIPA distribution function 23 allows recovery of a failed routing stack without disruption to connections through the backup stack.

The communication protocol stacks 22, 26, 30, 34 and 38 may be configured as to which stacks are routing stacks, backup routing stacks and server stacks. Different DVIPAs may have different sets of backup stacks, possibly overlapping. The definition of backup stacks may be the same as that for the VIPA takeover function described in U.S. patent application Ser. No. 09/401,419, U.S. Pat. No. 6,630,615, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

In providing for DVIPAs, up to five or more aspects of DVIPA operation may be addressed: 1) initialization and definition of DVIPAs and the affected protocol stacks; 2) incoming communications from network 44 to the DVIPA; 3) connections originated by a protocol stack (i.e. outgoing to network 44); 4) failure of a routing stack; and 5) recovery of a routing stack.

Turning now to the first of these aspects, for the present example, application APP A is associated with DVIPA VA1 which may be associated with the respective first, second and third instances of APP A; and application APP B likewise has DVIPA VB1 associated with the respective first, second and third instances of APP B.

Configuration of a dynamic routable VIPA may be provided by a new definition block established by a system administrator for each routing communication protocol stack 22 and 38. The new definition block defines dynamic routable VIPAs for which a communication protocol stack operates as the primary communication protocol stack. Backup protocol stacks may be defined as described of the VIPA takeover procedure. Thus, a definition block "VIPADynamic" may be defined as VIPADynamic Dynamic Routable VIPA definitions . . .

ENDVIPADynamic

The definitions within the VIPADynamic block for a protocol stack supporting moveable VIPAs are:

VIPADEFine MOVEable IMMEDiate netMask ipaddr . .
.

where the netMask is used to determine the network prefix to be advertised to routing daemons for OSPF or RIP and ipaddr is the IP address of the DVIPA. Both network prefix (sometimes known as subnet address) and the mask will be advertised to the routing daemon. All of the VIPAs in a single VIPADEFine statement must belong to the same subnet, network, or supernet, as determined by the network class and address mask. The MOVEable IMMEDiate parameters define the VIPAs as moveable VIPAs which may be transferred from one communication protocol stack to another. As will be appreciated by those of skill in the art in light of the present disclosure, while the MOVEable IMMEDiate parameters are expressly defined in the above definition statements, these or other parameters may be the default parameters which are provided unless specified otherwise. Thus, the parameters need not be expressly called out in all instances.

The definitions within the VIPADynamic block for backup are:

VIPABackup rank ipaddr . . .
where the rank is a number between 1 and 254 used to determine relative order within the backup chain(s) for the associated dynamic routable VIPA(s). A communication protocol stack with the higher rank will take over the dynamic VIPAs before a communication protocol stack with a lower rank.

The definitions in the VIPADYNamic block for defining a VIPA as a dynamic routable VIPA are:

VIPADISTribute ipaddr PORT portlist DESTIP ipaddrlist
where ipaddr is a VIPA defined in the VIPADEFine, portlist is a list of ports for which the DVIPA will apply. If the PORT keyword is omitted, then all ports for the ipaddr will be considered as DVIPAs. The ipaddrlist is a list of protocol stacks which will be included as server stacks in routing communications directed to the DVIPA. The IP addresses in the ipaddrlist may be XCF addresses of the protocol stacks or may be designated "ALL." If "ALL" is designated, then all stacks in the Sysplex are candidates for distribution. This may include future stacks which are not active when the routing stack is initialized. Thus, if ALL is specified, a protocol stack may be added to the DVIPA without disruption of operations and without user intervention to redefine the stack in the VIPADynamic block.

In addition to the above definitions, a range of IP addresses may be defined as DVIPAs utilizing the VIPARange definition. A VIPARange definition of the form:

VIPARange MOVEable NONDISRUPTIVE netMASK ipAddr may designate all future VIPAs created in the range as moveable or dynamic routable VIPAs. The MOVEable NONDISRUPTIVE parameters allows future instance-specific dynamic VIPAs to participate as dynamic routable VIPAs but does not affect dynamic VIPAs created under the range before the keyword DISTribute was added (e.g. via VARY OBEY).

In the first aspect, the communication protocol stacks 22 and 38, which are designated as routing protocol stacks as they have connections to the network 44 and include VIPADISTribute statements in the VIPADynamic block, publish the distribution information through messages broadcast by the VIPA takeover function 23 of each of the communication protocol stacks 22, 26, 30, 34 and 38 to the other communication protocol stacks 22, 26, 30, 34 and 38. At initialization or profile changes, the communication protocol stacks 22, 26, 30, 34 and 38 communicate to all partner communication protocol stacks the complete list of dynamic routable VIPAs, their associated ipAddrList and portlist and the primary and backup definitions for the communication protocol stack.

When a communication protocol stack 22, 26, 30, 34 and 38 receives the DVIPA information it notes if it is identified as a candidate target protocol stack or as a backup stack. If the protocol stack is a candidate target stack, it monitors its applications and sends a message to the defined routing stack when an application instance is bound to the DVIPA and listens on a defined port. If the protocol stack is a backup stack it stores the DVIPA information for use in the event of failure of the primary routing stack.

Returning to the example of FIG. 4, for MVS1 to MVS5 the VIPADEFine statements may be:

MVS1: VIPADEFine MOVEable IMMEDiate DVA1
VIPADISTribute DVA1 PORT 60 DESTIP XCF1, XCF2, XCF4

MVS5: VIPADEFine MOVEable IMMEDiate DVB1
VIPADISTribute DVB1 PORT 60 DESTIP ALL
VIPADISTribute DVA1 PORT 60 DESTIP XCF2, XCF3, XCF4

For purposes of illustration the respective address masks have been omitted because they are only significant to the routing daemons. In the above illustration, XCF1 is an XCF address of the TCP/IP stack on MVS1, XCF2 is an XCF address of the TCP/IP stack on MVS2 and XCF3 is an XCF address of the TCP/IP stack on MVS4. Note that, for purposes of the present example, definitions for MVS2, MVS3, and MVS4 are not specified. Such may be the case because the protocol stacks for these MVS images are candidate target protocol stacks and are not identified as routing protocol stacks and, therefore, receive their dynamic routable VIPA definitions from the routing protocol stacks. As is further illustrated, the backup routing communication protocol stack may have a separate VIPADISTribute definition for a DVIPA than the primary routing communication protocol stack. As described in more detail below, in such a case the explicit definition of the VIPADISTribute statement for the backup routing communication protocol stack in the event of failure of the primary routing stack. Additional VIPA definitions may also be provided, however, in the interests of clarity, such definitions have been omitted.

The VIPABackup statements for MVS1 and MVS5 of FIG. 4 may be:

MVS1: VIPABackup 30 DVB1
MVS5: VIPABackup 10 DVA1

With the above scenario in mind, embodiments of the present invention will now be described with reference to FIGS. 5 through 12 which are flowchart illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

Figure 5:
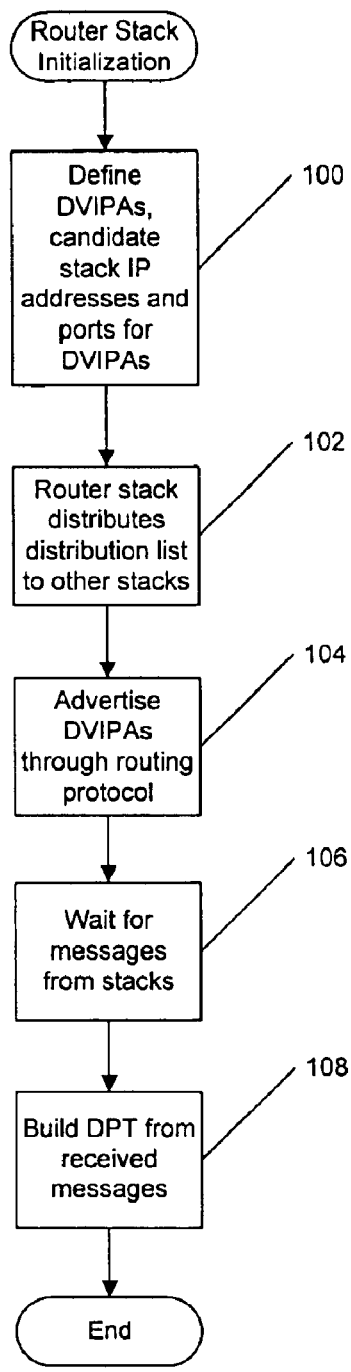
FIG. 5 is a flowchart illustrating operations for initialization of a routing protocol stack incorporating distributable VIPAs according to embodiments of the present invention.

FIG. 5 illustrates operations of a routing communication protocol stack, such as the protocol stacks 22 and 38 in FIG. 4 in the present example. As seen in FIG. 5, the dynamic routable VIPA is defined as described above to include the candidate target stack XCF IP addresses and the ports for the DVIPA (block 100). In the present example, the protocol stack 22 has DVIPA DVA1 identified as the dynamic routable VIPA, port 60 is routable and the candidate target stacks are communication protocol stacks corresponding to XCF addresses XCF1, XCF2, and XCF4. The protocol stack 38 has DVIPA DVB1 identified as the dynamic routable VIPA, port 60 is routable and the candidate target stacks are specified by the "ALL" value and may be any stack in the cluster.

The routing communication protocol stack distributes the list of DVIPAs, ports and candidate target stacks to each of the stacks in the cluster (block 102). Such a distribution may be carried out by, for example, broadcasting the information as part of a VIPA_list as is utilized in VIPA takeover. In the present example, communication protocol stacks 22 and 38 would distribute their information to the other communication protocol stacks 22, 26, 30, 34 and 38. The routing communication protocol stacks 22 and 38 also advertise their respective DVIPAs as IP addresses through the routing protocol utilized to communicate with the network 44 (block 104). Alternatively, as described below, with reference to FIGS. 11 and 12, ownership of the DVIPAs for communications on the network 44 may be established through the IP Assist function of Queued Direct I/O for OSA Express adapters.

The routing communication protocol stacks also wait for messages from the other communication protocol stacks which identify applications which are bound to their DVIPAs and listen on an identified port (block 106). As the messages are received, the routing communication protocol stacks build a Destination Port Table (DPT) which identifies those stacks having instances of applications bound to the DVIPA and listening on an identified port (block 108). Thus, the routing communication protocol stacks, such as the communication protocol stacks 22 and 38, are notified of which communication protocol stacks have applications bound to the DVIPA and which are available to distribute connections to the DVIPA so as to balance workload between the applications.

Figure 6:
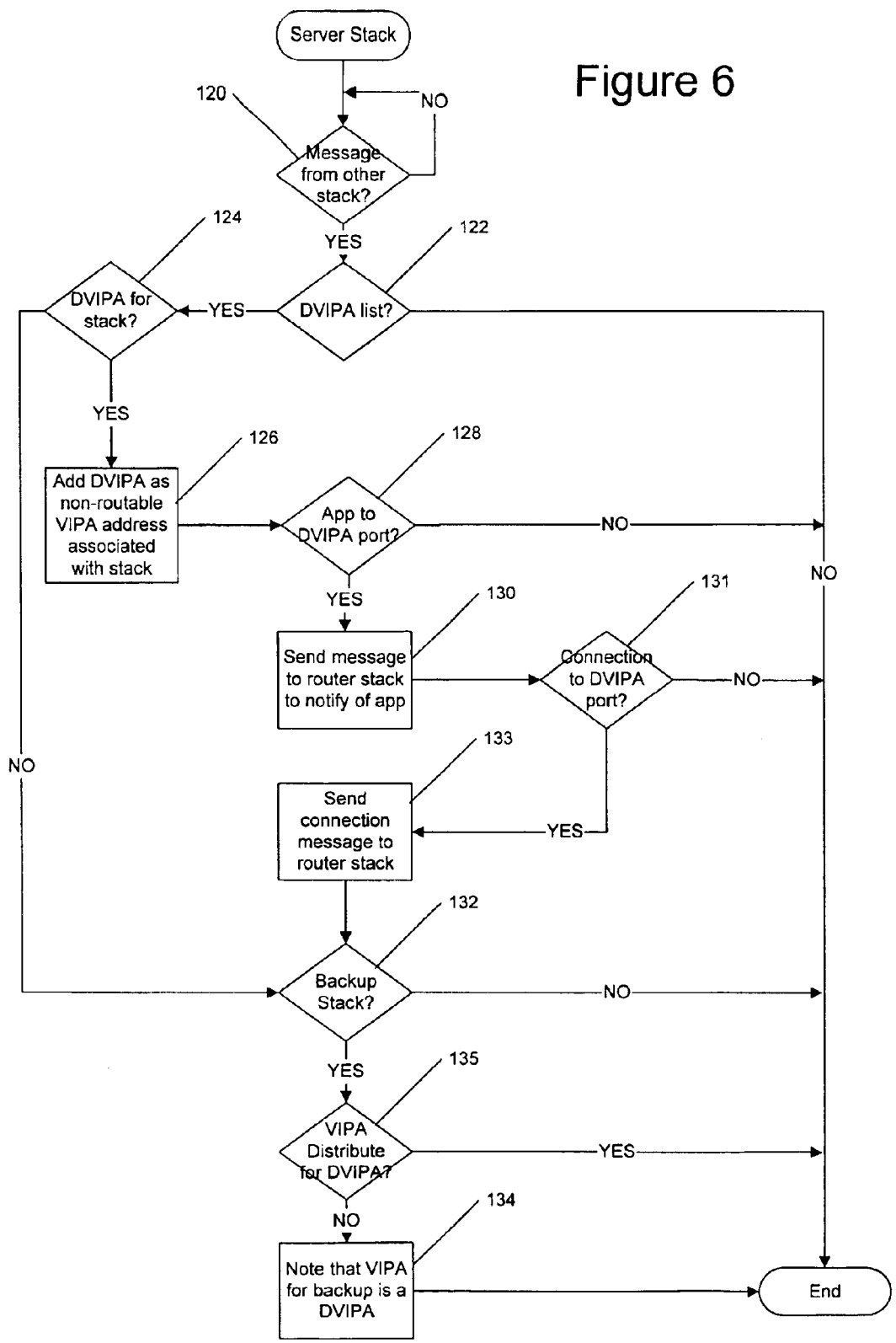
FIG. 6 is a flowchart illustrating operations of a server protocol stack according to embodiments of the present invention.

FIG. 6 illustrates operations carried out by a VIPA distribution function 23 of a communication protocol stack upon receiving a message from another communication protocol stack. As seen in FIG. 6, when a protocol stack receives a message (block 120), the protocol stack determines if the message contains a VIPA list (block 122). If not, then operations of the VIPA distribution function 23 terminate. If DVIPA information is present in the message, then the VIPA distribution function 23 determines if the communication protocol stack is identified as a candidate target stack for the DVIPA (block 124). If the communication protocol stack is a candidate target stack, either as a result of being expressly enumerated in a list or because the "ALL" parameter is specified for the DVIPA, then the protocol stack adds the DVIPA as a non-advertised or internal VIPA address (i.e. not advertised to the routing protocol), if it is not already active as such, which may be utilized by the communication protocol stack in a manner similar to a loopback address (block 126).

The communication protocol stack also monitors the addresses and ports associated with application instances utilizing the protocol stack and, if an application utilizing the protocol stack is bound or binds to the DVIPA and listens on a port identified in the VIPA list as a DVIPA port (block 128), the protocol stack sends a message to the routing communication protocol stack associated with the DVIPA to notify the routing communication protocol stack that communications may be routed to the application through the candidate target stack (block 130). Such candidate target protocol stacks which have applications bound to the DVIPA and listening on a port associated with the DVIPA may be referred to as a "current actual target" and, as described above, are identified in the DPT of the routing communication protocol stack as available for receiving connections. A message may also be sent if an application instance bound to a DVIPA and listening to a port identified in the VIPA list terminates so that the VIPA distribution function 23 of the routing communication protocol stack may maintain an up-to-date DPT. While the sending of a message to notify the routing communication protocol stack of the existence of an application bound to the DVIPA and listening to a port of the DVIPA is illustrated in FIG. 6 as responsive to receiving a message from the routing communication protocol stack, as will be appreciated by those of skill in the art, once the DVIPA is active, such messages could be sent any time the candidate target stack detects that an application is bound to the DVIPA and listening on a DVIPA port.

Furthermore, the candidate target protocol stack may also determine if there are any active connections to the DVIPA (block 131). If so, then a connection message may be sent to the routing protocol stack (block 133) to notify it of the existence of the connection. In such a manner the routing protocol stack may incorporate the connection in its current routing table as described herein. Such a connection message may allow for movement of connections between routing protocol stacks, for example, to recover from a failure of a routing protocol stack.

Irrespective of whether a communication protocol stack is a candidate target stack or a current actual target stack, a communication protocol stack may be a backup for a routing communication protocol stack. Thus, as seen at block 132, the communication protocol stack may determine if it is a backup for the routing communication protocol stack associated with the VIPA list. The backup routing communication protocol stack may also determine it if has its own VIPADISTribute statement such that it would override the VIPA list information (block 135). If so, then the communication protocol stack need not maintain the VIPA list information as it will use its own information. Otherwise, the backup communication protocol stack maintains the information from the VIPA list so as to perform backup operations in the event of failure of the primary routing stack (block 134). Thus, the backup protocol stack may utilize a different distribution pattern than the primary protocol stack. Such differences may allow for reducing the disruption of a failed stack until the failed stack may be restored by, for example, adding candidate target stacks that are only utilized when a failure of the routing stack occurs.

In the present example illustrated in FIG. 4, the protocol stack 22 of MVS1 would broadcast a VIPA list (DVIPA_list_1) identifying MVS1 as the primary routing communication protocol stack, DVA1 as a dynamic routable VIPA with port 60 as an associated port and the communication protocol stacks 22, 26 and 34 as candidate target communication protocol stacks. Additionally, the protocol stack 38 of MVS5 would broadcast a VIPA list (DVIPA_list_2) identifying MVS1 as the primary routing communication protocol stack, DVB1 as a dynamic routable VIPA with port 60 as an associated port and all of the communication protocol stacks 22, 26 30, 34 and 38 as candidate target communication protocol stacks. Also, the communication protocol stack 22 would be identified as a backup to the communication protocol stack 38 and the communication protocol stack 38 would be identified as a backup to the communication protocol stack 22. The communication protocol stack 22 would retain the information in the distributed VIPA list for DVB2 as the communication protocol stack 22 does not have a VIPADISTribute statement for DVB2. However, the communication protocol stack 38 need not retain the received VIPA list for DVA1 as it has its own, explicit, VIPADISTribute statement for DVA1.

When, for example, communication protocol stack 26 receives DVIPA_list_1, it examines the list and determines that it is identified as a candidate target stack. Thus, the VIPA distribution function 23 of communication protocol stack 26 adds the DVIPA DVA1 as a non-routable VIPA and determines if an application is executing which is bound to DVA1 and listening to port 60. For purposes of the present example, APP A is bound to DVA1 and listening to port 60 so the communication protocol stack 26 sends a SRVSTAT message to communication protocol stack 22 identifying itself as a current actual target. The VIPA distribution function 23 of the communication protocol stack 22 incorporates the XCF address of the communication protocol stack 22 into its DPT. Messages to port 60 of the DVIPA may then be routed to the communication protocol stack 26. Because no connections exist at this time a NEWCONN message is not sent.

When the communication protocol stack 30 receives DVIPA_list_1, it examines the list and is not identified as a candidate target stack or as a backup to the communication protocol stack 22 and may disregard the list. When the communication protocol stack 38 receives DVIPA_list_1, it examines the list and is not identified as a candidate target stack but is identified as a backup to the communication protocol stack 22. Thus, the communication protocol stack 38 stores the list for use in error recovery.

When any of the communication protocol stacks 22, 26, 30, 34 and 38 receive the DVIPA_list_2, then note that the "ALL" parameter is identified and add the DVIPA DVB1 as a non-routable VIPA. These communication protocol stacks 22, 26, 30, 34 and 38 the monitor for applications bound DVB1 and listening on port 60 to determines if an application is executing which is bound to DVA1 and listening to port 60. If and when such an application binds to DVB2 and listens on port 60 a SRVSTAT message is sent to the communication protocol stack 38 to identify the candidate target stack as a current actual target as described above. Furthermore, if a communication protocol stack is subsequently activated, it too will identify DVB1 as a DVIPA and add DVB1 as a non-routable VIPA.

Figure 7:
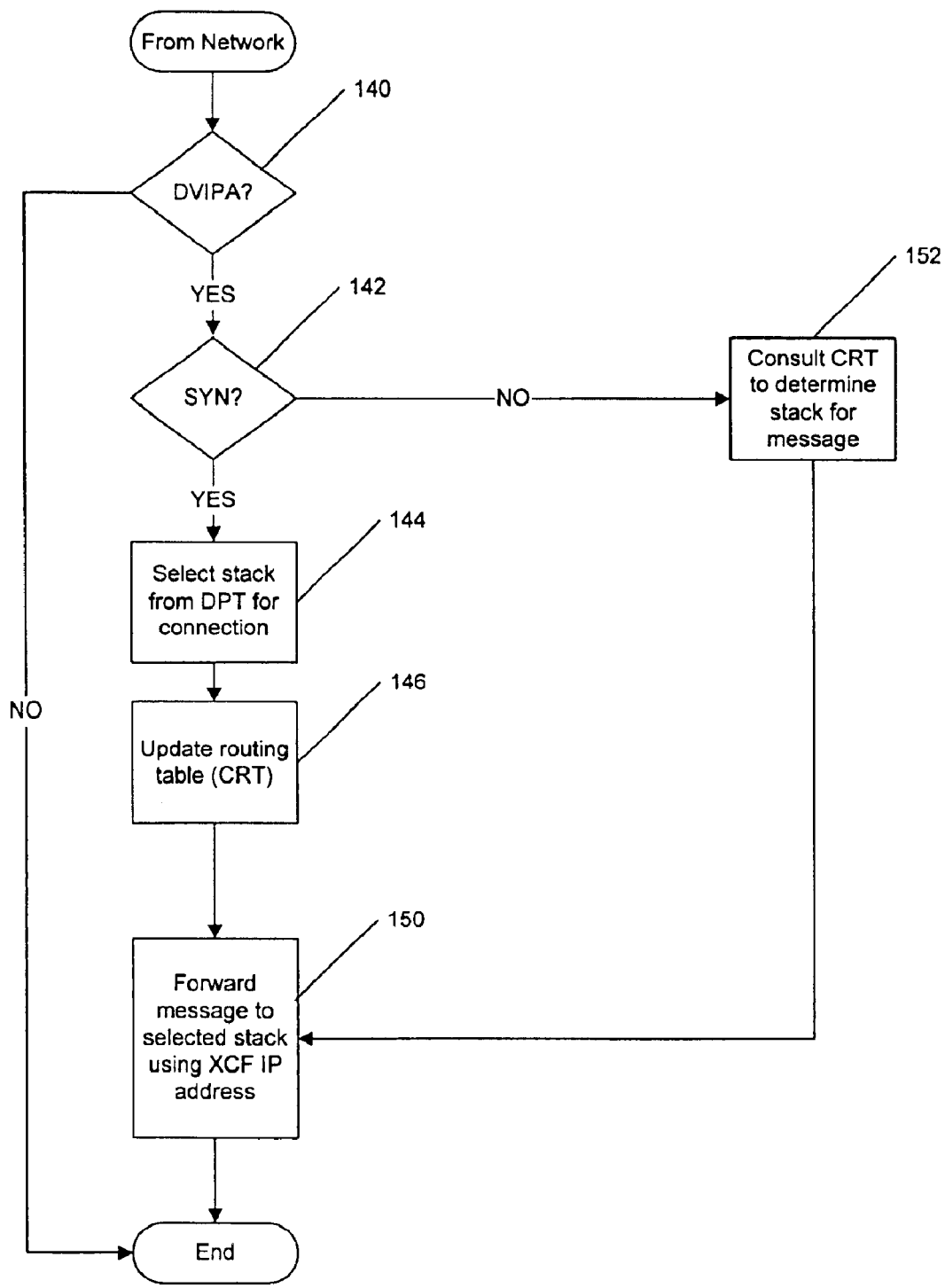
FIG. 7 is a flowchart illustrating operations for a incoming communications to the routing protocol stack according to embodiments of the present invention.

FIG. 7 illustrates operations of a routing communication protocol stack when a communication is received from the network 44. As is seen in FIG. 7, the VIPA distribution function 23 of the communication protocol stack determines if the communication is to a DVIPA associated with the stack (block 140) by, for example, examining the IP address and port of the communication and comparing that with those of the DVIPAs for the protocol stack. If the communication is not to a DVIPA of the protocol stack, then operations of the VIPA distribution function 23 may terminate with respect to the communication.

If the communication is to a DVIPA of the protocol stack, then the VIPA distribution function 23 determines if the communication is a SYN to establish a connection to the DVIPA (block 142). If so, then the VIPA distribution function 23 may select a current actual target for the connection (i.e. a communication protocol stack with an application bound to the DVIPA and listening to the port specified by the communication)(block 144). Such a selection may, for example, be based on predefined criteria, utilizing a predefined selection pattern, such as round-robin, weighted round-robin or the like, or may be based on dynamic criteria, policies or combinations thereof. For example, the selection may be made to distribute workload between the candidate target stacks. Thus, a workload manger and/or a service policy agent may be consulted in selecting the candidate target stack.

However the selection is made, the VIPA distribution function 23 updates a current routing table (CRT) which defines the path from the routing communication protocol stack to the selected current actual target (block 146). Such an update may take the form of creating an entry incorporating the source IP address, DVIPA and port and the XCF address of the selected current actual target. The message is also forwarded to the selected current actual target using the XCF address of the current actual target (block 150).

Returning to block 142, if the communication is not a SYN message, then the VIPA distribution function 23 of the routing communication protocol stack consults the CRT to route the communication and, if an appropriate destination communication protocol stack is found, routes the communication to the current actual target for the communication (block 152). The communication is then forwarded to the current actual target specified by the CRT (block 150).

Figure 8:
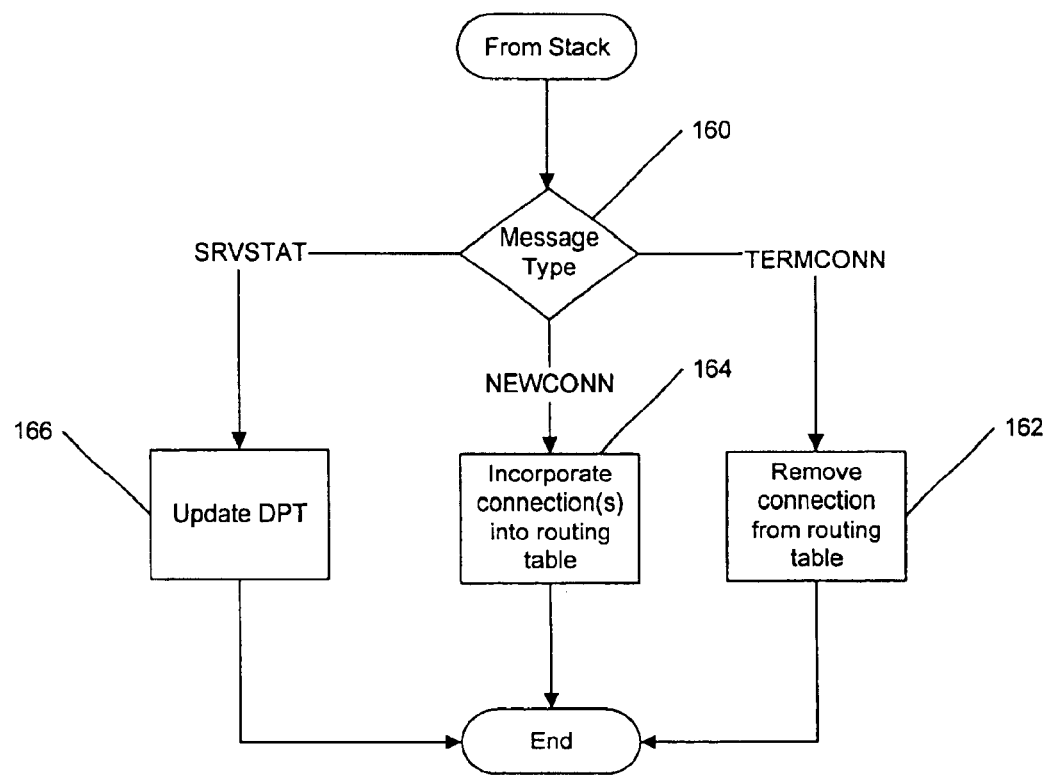
FIG. 8 is a flowchart illustrating operations of a routing protocol stack receiving communications from another protocol stack according to embodiments of the present invention.

FIG. 8 illustrates operations of the VIPA distribution function 23 of the routing communication protocol stack when a message is received from another communication protocol stack. As is seen in FIG. 8, the VIPA distribution function 23 determines the type of message received (block 160). If the message is a SRVSTAT message, then, as described above, the application and communication protocol stack entries of the DPT are updated (block 166) by the VIPA distribution function 23. As described above, the SRVSTAT message may be sent by a communication protocol stack both when an application instance binds to the DVIPA and listens to an associated port and when the application instance terminates. Thus, the SRVSTAT message may be utilized by the VIPA distribution function 23 to maintain the DPT with up-to-date information as to the current actual targets available for connections (block 166).

Returning to block 160, the VIPA distribution function 23 may also determine if the message is a new connection message (NEWCONN). Such a message may be generated if an application bound to a DVIPA utilizing a port in the VIPA list initiates a connection or, as described above, if a communication protocol stack receives a VIPA list with a DVIPA which already have applications using the DVIPA for connections, then the VIPA distribution function 23 of the communication protocol stack sends a NEWCONN message to the routing communication protocol stack to notify the routing communication protocol stack of the connection. If the message is a NEWCONN message, then the VIPA distribution function 23 incorporates the connection into the CRT (block 164). Such an incorporation of the connection into the CRT may be carried out as described above for connections originated from network 44.

A third type of message which may be received by the VIPA distribution function 23 is a connection termination message (TERMCONN). Such a message may be generated by a VIPA distribution function 23 when a connection terminates. When the connection terminates, the VIPA distribution function 23 of the communication protocol stack sends a TERMCONN message to the routing communication protocol stack to notify the routing communication protocol stack that the connection has ended and routing for the connection may be discontinued. Thus, if the message is a TERMCONN message (block 160), then the VIPA distribution function 23 removes the connection from the CRT (block 162). Such a removal of the connection from the CRT may be carried out by, for example, deleting or invalidating an entry in the CRT corresponding to the connection.

Returning to the example illustrated in FIG. 4, when a SYN message to port 60 of DVA1 is received from network 44 by communication protocol stack 22, the VIPA distribution function 23 determines that the SYN is to a dynamic routable VIPA for which it is the routing communication protocol stack, consults it DPT and optionally a workload management function (not shown) and selects a current actual target as a destination for the message. Thus, the VIPA distribution function 23 of the communication protocol stack 22 may select the communication protocol stack 26 as a destination. The communication protocol stack 22 creates an entry for the connection in its CRT and forwards the message to the communication protocol stack 26. Subsequent messages from the network 44 to port 60 of DVA1 from the source IP address will also be routed to the communication protocol stack 26 using the CRT entry.

An instance of APP A of the communication protocol stack 26 bound to DVA1 and utilizing port 60 may also establish a connection over network 44 either directly or through another protocol stack. When such occurs, the VIPA distribution function 23 of communication protocol stack 26 sends a NEWCONN message to the routing communication protocol stack 22 identifying the new connection. The VIPA distribution function 23 of communication protocol stack 22 receives the NEWCONN message and updates its CRT to route communications from the identified new connection to port 60 of DVA1 to the communication protocol stack 26. Such an identification may be made by, for example, providing the source IP address of the other end of the connection, the DVIPA and port and the XCF address of the communication protocol stack 26 to the routing communication protocol stack 22.

In any event, when either of the connections ends, the VIPA distribution function 23 of the communication protocol stack 26 sends a TERMCONN message to the VIPA distribution function 23 of the communication protocol stack 22. The VIPA distribution function 23 of the communication protocol stack 22 removes the entry from the CRT corresponding to the function and, thereby, terminates routing for the connection.

Figure 9:
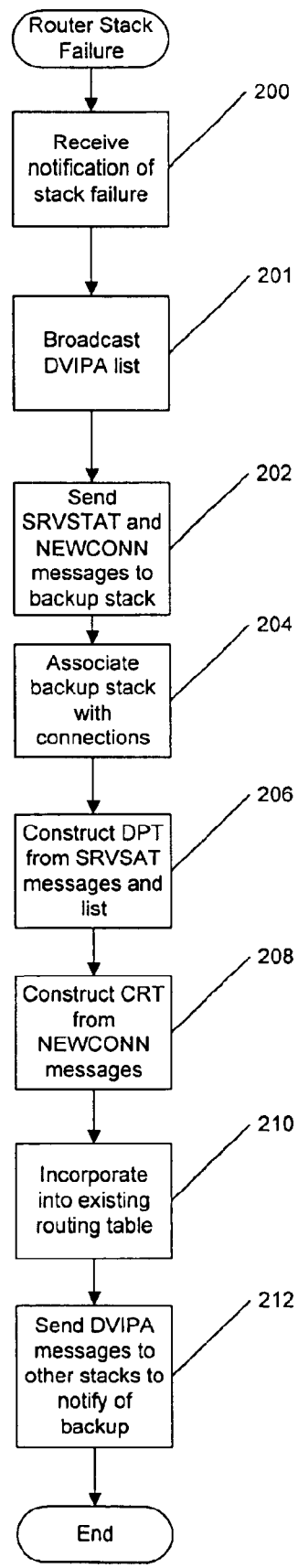
FIG. 9 is a flowchart illustrating operations of protocol stacks during failure of a routing protocol stack according to embodiments of the present invention.
Figure 10:
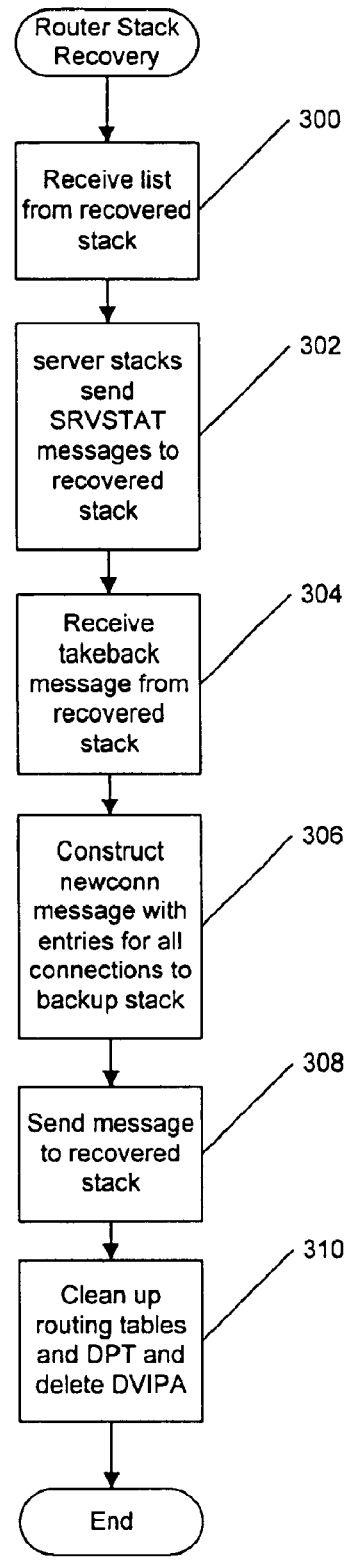
FIG. 10 is a flowchart illustrating operations of protocol stacks according to embodiments of the present invention incorporating moveable VIPAs for recovery of a failed routing protocol stack.

FIGS. 9 and 10 illustrate operations of the VIPA distribution function 23 during failure of a routing communication protocol stack and during recovery of a routing communication protocol stack. As seen in FIG. 9, when a failure occurs, the other communication protocol stacks in the cluster of data processing systems are notified of the failure (block 200). The communication protocol stack identified as the backup stack for the dynamic routable VIPA takes over routing functions for that DVIPA so as to become a backup routing communication protocol stack. In addition, the backup routing communication protocol stack may broadcast the DVIPA list that it will utilize in routing connections for the DVIPA (block 201). This list may be the list provided by the primary routing communication protocol stack or a list defined explicitly for the backup routing communication protocol stack. Alternatively, the list may need only be distributed in the instance where the backup routing communication protocol stack has an explicitly defined DVIPA list.

As described above, because of the broadcast of information each of the communication protocol stacks is aware that it is a candidate target for a DVIPA and the identity of the highest ranking backup routing communication protocol stack. Therefore, the communication protocol stacks with application instances bound to the DVIPA and listening on an associated port may send a SRVSTAT message and a NEWCONN message(s) for connections to the DVIPA for the communication protocol stack to the backup routing communication protocol stack (block 202). The communication protocol stacks also associate the backup routing communication protocol stack with any connections utilizing the DVIPA so that subsequent messages for the DVIPA are sent to the backup routing communication protocol stack (block 204). The backup routing communication protocol stack utilizes the SRVSTAT messages and its information from the appropriate VIPA list to build a new DPT for the DVIPA (block 206).

The backup routing communication protocol stack also receives NEWCONN messages from the server communication protocol stacks with existing DVIPA connections and constructs a CRT based on these messages (block 208). The routing information from the constructed CRT is incorporated into the backup routing communication protocol stack's own CRT (block 210). The backup routing communication protocol stack may also send its own DVIPA messages to the other communication protocol stacks to notify the other communication protocol stacks that it is performing the backup function (block 212). Such messages may be sent to prevent other backup communication protocol stacks in a list of backups from taking over the DVIPA. Details on the transfer of a VIPA to a backup are provided in U.S. patent application Ser. No. 09/401,419 described above. Furthermore, in particular embodiments, the issuance of the SRVSTAT or the NEWCONN messages may be in response to the DVIPA messages sent by the backup routing communication protocol stack. Thus, embodiments of the present invention are not limited to the sequence illustrated in FIGS. 9 and 10. Operations then continue with the backup routing communication protocol stack operating as the routing communication protocol stack described above.

Turning to FIG. 10, when the primary communication protocol stack recovers, it again broadcasts its VIPA list which is received by the other communication protocol stacks (block 300). In response to receiving the VIPA list, the candidate target stacks send SRVSTAT messages to the recovered primary routing communication protocol stack (block 302) which identify the stacks which have application instances bound to the DVIPA and utilizing a port of the VIPA list. The recovered primary routing communication protocol stack also sends a DVIPA message to the backup communication protocol stack which receives the takeback message (block 304) and generates a NEWCONN message for all the connections which are routed through the backup communication protocol stack (block 306). The NEWCONN message is sent to the primary routing communication protocol stack (block 308) and the primary routing communication protocol stack constructs a CRT based on the information form the message. Alternatively, the server stacks may send NEWCONN messages directly to the recovered primary routing stack either in response to receiving the VIPA list or the DVIPA message. In any case, routing of the existing connections may then be performed by the primary routing communication protocol stack. Finally, the backup routing communication protocol stack deletes the DVIPA and cleans up its routing and DPT tables (block 310). Thus, the routing of the DVIPA is returned to the recovered stack.

In the example illustrated in FIG. 4, assume that the communication protocol stacks 26 and 34 have applications with connections routed through the DVIPA of the routing communication protocol stack 22. Furthermore, the communication protocol stack 38 is defined as the backup to the communication protocol stack 22. If the communication protocol stack 22 fails, then the communication protocol stacks 26 and 34 send SRVSTAT messages to the backup routing communication protocol stack 38 identifying them as current actual targets. The communication protocol stacks 26 and 34 also associate the communication protocol stack 38 with the DVIPA DVA1 and send all subsequent messages to the backup routing communication protocol stack 38. The communication protocol stack 38 builds its DPT from the SRVSTAT messages, receives NEWCONN messages for connections through the failed communication protocol stack 22 and creates routing information for incorporating in its CRT. The backup routing communication protocol stack 38 incorporates the routing information into its routing table and begins routing messages for the connections routed through the failed communication protocol stack. The backup routing communication protocol stack 38 may also send a DVIPA message to the other communication protocol stacks 26, 30 and 34 to indicate that it is backing up the DVIPA DVA1.

When the primary routing communication protocol stack 22 is recovered, it sends a VIPA list to the other communication protocol stacks 26, 30, 34 and 38. The VIPA list message signals the other communication protocol stacks 26, 30, 34 and 38 to send SRVSTAT messages to the communication protocol stack 22 so as to identify current actual targets for the DVIPA DVA1. The communication protocol stack 22 builds a DPT from the SRVSTAT messages. The backup routing communication protocol stack 38 also generates a NEWCONN message for each connection to DVA1 routed through the backup routing communication protocol stack 38 and sends this message tot the communication protocol stack 22. Alternatively, the server communication stacks may send NEWCONN messages in response to the VIPA list identifying existing connections to the DVIPA. In any case, the communication protocol stack 22 builds a CRT from the NEWCONN message(s). The backup routing communication protocol stack 38 cleans up its routing tables and deletes DVA1 so that it no longer performs routing for DVA1. Thus, control of DVA1 is transferred back to the communication protocol stack 22 with limited disruption to the connections.

As a further example of embodiments of the present invention, operations for the movement of dynamic VIPAs, whether routable or not, will now be described. As mentioned above, a dynamic VIPA may be established by an IOCTL or bind to a VIPA defined in the VIPARange as MOVEable NONDIRUPTIVE or in a VIPADEFine statement as MOVEable IMMEDiate. In either case, the DVIPA messages described above may be utilized to move the VIPA from an existing protocol stack to a new protocol stack with the new protocol stack routing the connection to the existing protocol stack. Thus, the dynamically routable VIPA routing function may be used with non-distributed (existing) dynamic VIPAs to allow immediate movement of a dynamic VIPA from a first protocol stack to a second protocol stack without requiring that all connections to the VIPA at the first protocol stack be terminated. Also, the routing function may allow connections to the first stack to be maintained and new connections created to the second protocol stack by routing the old connections to the first protocol stack until they terminate. Thus, a gradual, non-disruptive takeback of connections may be achieved.

Figure 11:
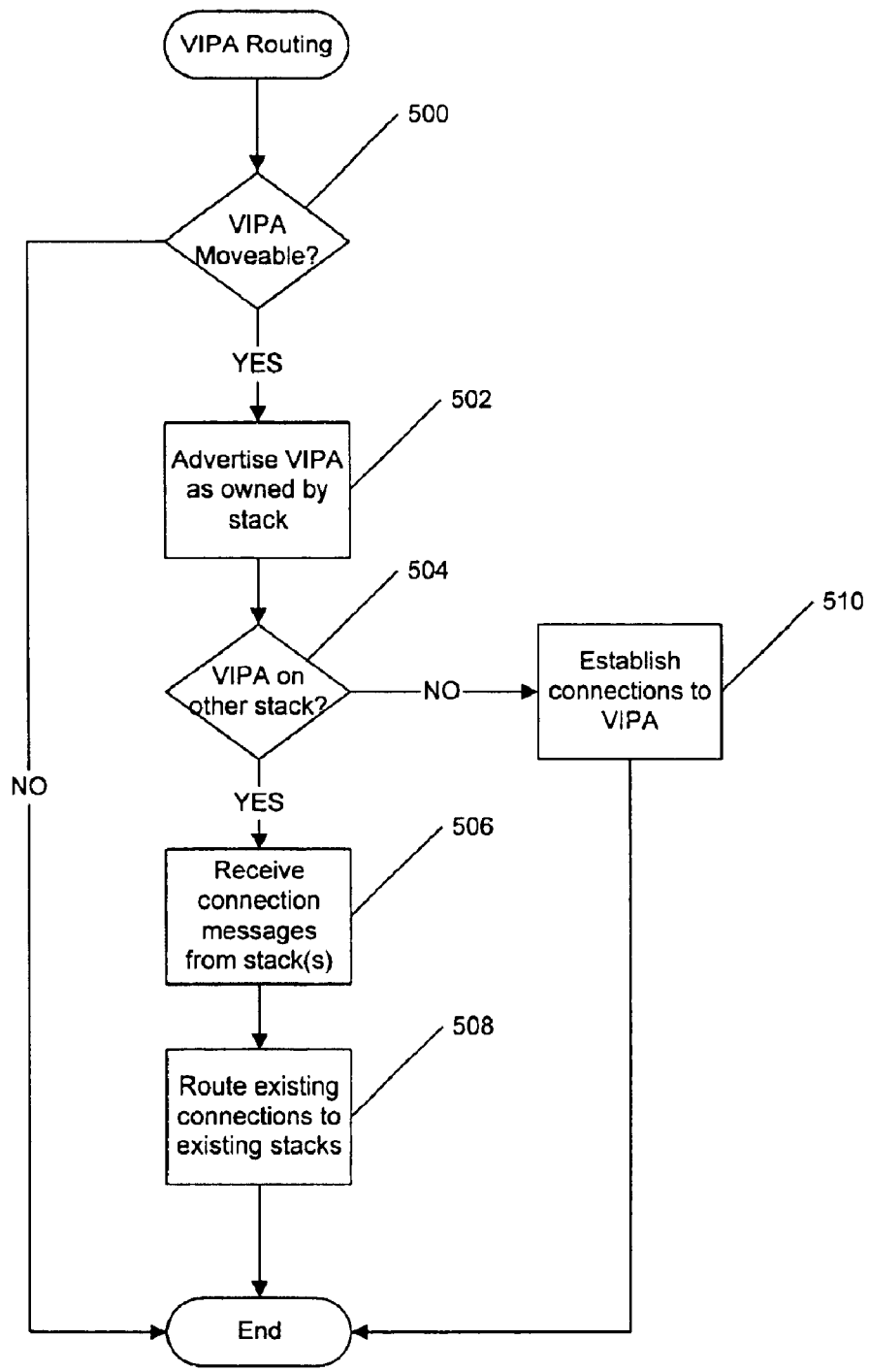
FIG. 11 is a flowchart illustrating operations of a communication protocol stack which owns a moveable VIPA.
Figure 12:
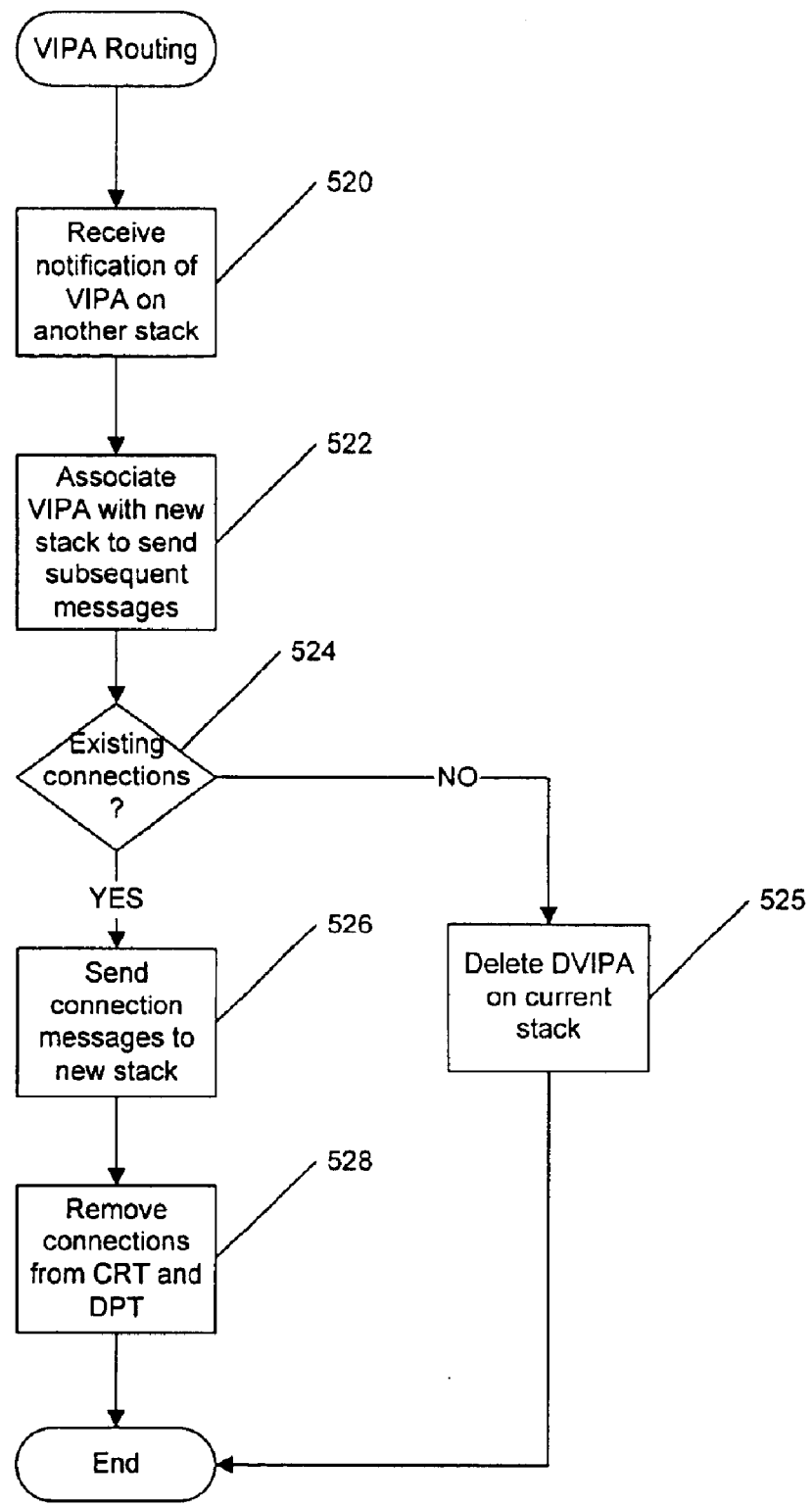
FIG. 12 is a flowchart illustrating operations of a communications protocol stack in response to loss of ownership of a moveable VIPA.

FIGS. 11 and 12 illustrate operations of a communication protocol stack to facilitate the moveable VIPA. As seen in FIG. 11, when a dynamic VIPA is initialized, by a protocol stack it may be determined if the VIPA is a moveable nondisruptive VIPA (block 500). Initialization of the VIPA may occur, for example, by an application binding to a VIPA in a VIPA range which is defined as MOVEable NONDISRUPtive. If so, then the VIPA may be advertised to the routing protocol (block 502). Alternatively, if the IP gateway of a cluster of data processing systems is OSA Express using Queued Direct I/O, the IP Assist function may automatically update the OSA Express adapter when a "home list" of a protocol stack is updated. Thus, in such an automatic update scenario, the operations of block 502 may be skipped. It may also be determined if the VIPA is active on another stack (block 504). Such a determination may be made by previous messages from the other stack advertising the existence of the VIPA. If the VIPA is not active on another stack, then the current stack may establish connections using the VIPA without using the other stack as routing stack (block 510). The current stack may also create routing and destination port tables as described above in the event that the VIPA is moved to another stack or in the event that other stacks look to the current stack as a routing communication protocol stack.

If there is a VIPA on another stack (block 504), then the current stack receives connection administration messages from the other stack or stacks identifying existing connections to the stack (block 506). The current stack builds a routing table from these connection administration messages and routes information to these existing connections (block 508). Such a communication sequence may result from the advertisement that the current stack owns the VIPA. The current stack may also receive subsequent requests for connections to the VIPA and termination messages for existing connections to the VIPA so as to manage routing of information to the appropriate communication protocol stacks as described herein. Thus, ownership of the VIPA may be immediately transferred to a new communication protocol stack without disrupting existing connections.

FIG. 12 illustrates operations of a communication protocol stack which owns a VIPA in response to a new communication protocol stack claiming ownership. As seen in FIG. 12, notification of the VIPA on another communication protocol stack is received (block 520) and the VIPA is associated with the new communication protocol stack (block 522) such that all messages concerning new or existing connections are sent to the new communication protocol stack. It may also be determined if there are existing connections to the VIPA (block 524). If no connections exist, then the transfer of ownership is complete merely by associating the VIPA with the new communication protocol stack and deleting the DVIPA from the current communication protocol stack (block 525). However, if connections exist, then an existing connection message is sent to the new communication protocol (block 526). As described herein, such a message may be for all connections associated with the stack or only for those which the stack is an endpoint node. Such a message may be a NEWCONN message as described above. Furthermore, if the current stack was performing any routing functions, these functions are also transferred to the new communication protocol stack and so the routing tables and destination port tables of the current communication protocol stack may be purged of the connections (block 528).

As an example of operations for a moveable VIPA according to the present invention, assume that the communication protocol stack 38, which functions as a primary routing communication protocol stack for DVIPA DVB1, has not been started. Also assume that the communication protocol stack 30 is initialized and an instance APP B started and binds to a VIPA in the VIPARange statement, such as DVB1. In this case, connections to DVB1 would be established to the communication protocol stack 30. Subsequently, when the communication protocol stack 26 was initialized and an instance of APP B bound to DVB1, the communication protocol stack 26 would send a VIPA list identifying the communication protocol stack 26 as the owner of the VIPA and, in response, the communication protocol stack 30 would send a NEWCONN message. The communication protocol stack 26 would receive the NEWCONN message and incorporate a route for the connection to the communication protocol stack 30 into its routing tables. The communication protocol stack 30 would send all subsequent messages regarding the connection to the communication protocol stack 26. When the communication protocol stack 38 is initialized, it would assume ownership of the VIPA as the primary routing communication protocol stack and would send a VIPA list to the other communication protocol stacks identifying itself as such. It may also send a takeback message as well to take ownership of the VIPA. The communication protocol stacks 30 and 26 which have existing connections to the VIPA would send a message identifying the existing connections to the communication protocol stack 38 which would incorporate routing paths for the connections into its routing table. Subsequent messages regarding the existing connections would be sent to the communication protocol stack 38 and subsequent connections would be made through the communication protocol stack 38. Thus, ownership of the VIPA was transferred nondisruptively from the communication protocol stack 30 to the communication protocol stack 26 to the communication protocol stack 38.

As used herein, the term "connection administration message" refers to messages between communication protocol stacks which are utilized to manage the routing of TCP/IP messages between the communication protocol stacks. Thus, for example, the NEWCONN, TERMCONN and VIPA lists may be considered connection administration messages.

While the present invention has been described with respect to the VIPA distribution function as a part of the communication protocol stack, as will be appreciated by those of skill in the art, such functions may be provided as separate functions, objects or applications which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environments by associating applications or groups of applications with an address rather than a communications adapter. Thus, the present invention may be suitable for use in any collection of data processing systems which allow sufficient communication to all of for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of communicating with a plurality of application instances executing on a cluster of data processing systems having a plurality of communication protocol stacks associated therewith utilizing a single Internet Protocol (IP) address, the method comprising the steps of:

establishing a first of the plurality of communication protocol stacks as a routing communication protocol stack associated with the single IP address;

defining ones of the plurality of communication protocol stacks which are associated with the single IP address as candidate target communication protocol stacks;

distributing among the plurality of communication protocol stacks an identification of protocol stacks which are associated with the single IP address and an identification of the routing communication protocol stack;

notifying the routing communication protocol stack when an instance of the plurality of application instances associated with a candidate target communication protocol stack listens to a port of the single IP address so as to define the candidate target communication protocol stack as a current actual target stack;

receiving a request to establish a connection to the single IP address and the port of the single IP address;

establishing a routing table entry corresponding to the current actual target stack responsive to receiving a request to establish a connection to the single IP address and the port so as to define a routing path associated with the IP address and the port from the routing communication protocol stack to the current actual target stack; and routing communications for the connection to the port of the IP address received by the routing communication protocol stack based on the routing table.

2. A method according to claim 1, wherein the step of defining ones of the plurality of communication protocol stacks which are associated with the single IP address as candidate target communication protocol stacks comprises the step of defining all of the plurality of communication protocol stacks of the cluster of data processing systems as candidate target communication protocol stacks.

3. A method according to claim 1, wherein the step of defining ones of the plurality of communication protocol stacks which are associated with the single IP address as candidate target communication protocol stacks comprises the step of defining enumerated ones of the plurality of communication protocol stacks of the cluster of data processing systems as candidate target communication protocol stacks.

4. A method according to claim 1, wherein the step of establishing a first of the plurality of communication protocol stacks as a routing communication protocol stack associated with the single IP address comprises the step of establishing a first of the plurality of communication protocol stacks as a routing communication protocol stack associated with the single IP address for routing communications associated with at least one specified port associated with the IP address;

wherein the step of defining ones of the plurality of communication protocol stacks which are associated with the single IP address as candidate target communication protocol stacks comprises the step of defining ones of the plurality of communication protocol stacks which are associated with the at least one specified port associated with the IP address as candidate target communication protocol stacks;

wherein the step of defining ones of the plurality of communication protocol stacks which are associated with the single IP address as candidate target communication protocol stacks comprises the step of distributing among the plurality of communication protocol stacks an identification of protocol stacks which are associated with the at least one port of the single IP address as candidate target communication protocol stacks and an identification of the routing communication protocol stack; and wherein the step of notifying the routing communication protocol stack when an instance of the plurality of application instances associated with a candidate target communication protocol stack listens to a port of the single IP address so as to define the candidate target communication protocol stack as a current actual target stack comprises the step of notifying the routing communication protocol stack when an instance of the plurality of application instances associated with a candidate target communication protocol stack listens to the at least one port of the single IP address so as to define a current actual target stack.

5. A method according to claim 4, wherein the at least one port comprises a plurality of ports identified in a port list associated with the single IP address.

6. A method according to claim 4, wherein the at least one port comprises all ports associated with the single IP address.

7. A method according to claim 1, further comprising:

notifying the routing communication protocol stack that the instance of the plurality of application instances associated with the candidate target communication protocol stack has terminated listening to the port of the single IP address; and removing the routing table entry corresponding to the candidate target communication protocol stack so as to remove the routing path associated with the IP address, the port and the candidate target communication protocol stack.

8. A method according to claim 7, wherein the step of notifying the routing communication protocol stack that the instance of the plurality of application instances associated with the candidate target communication protocol stack has terminated listening to the port of the single IP address comprises the step of sending a termination message through a cross coupling facility of the cluster of data processing systems.

9. A method according to claim 1, wherein the steps of establishing a first of the plurality of communication protocol stacks as a routing communication protocol stack associated with the single IP address and defining ones of the plurality of communication protocol stacks which are associated with the single IP address comprise the step of incorporating a VIPADISTribute statement in a VIPADynamic definition block associated with the first communication protocol stack, wherein the VIPADISTribute statement defines an IP address as a dynamic routable virtual IP address (VIPA), identifies ports associated with the VIPA which are routable, and identifies communication protocols stacks associated with the VIPA.

10. A method according to claim 9, wherein the step of distributing among the plurality of communication protocol stacks an identification of protocol stacks which are associated with the single IP address and an identification of the routing communication protocol stack comprises broadcasting a list including the definitions of the VIPADISTRibute statement.

11. A method according to claim 1, further comprising the steps of:

notifying the routing communication protocol stack that a connection utilizing the single IP address and the port of the singe IP address has terminated; and removing the routing table entry corresponding to the connection to the current actual target stack so as to remove the routing path associated with the IP address, the port and the current actual target stack.

12. A method according to claim 1, wherein the step of establishing a routing table entry is preceded by the step of selecting a current actual target stack so as to provide a selected communication protocol stack associated with the connection request; and wherein the step of establishing a routing table entry corresponding to the current actual target stack responsive to receiving a request to establish a connection to the single IP address and the port so as to define a routing path associated with the IP address and the port from the routing communication protocol stack to the current actual target stack comprises the step of establishing a routing table entry corresponding to the selected communication protocol stack associated with the connection request to provide a routing path associated with the IP address and the port from the routing communication protocol stack to the selected communication protocol stack.

13. A system for communicating with a plurality of application instances executing on a cluster of data processing systems having a plurality of communication protocol stacks associated therewith utilizing a single Internet Protocol (IP) address, comprising:

means for establishing a first of the plurality of communication protocol stacks as a routing communication protocol stack associated with the single IP address;

means for defining ones of the plurality of communication protocol stacks which are associated with the single IP address as candidate target communication protocol stacks;

means for distributing among the plurality of communication protocol stacks an identification of protocol stacks which are associated with the single IP address and an identification of the routing communication protocol stack;

means for notifying the routing communication protocol stack when an instance of the plurality of application instances associated with a candidate target communication protocol stack listens to a port of the single IP address so as to define the candidate target communication protocol stack as a current actual target stack;

means for receiving a request to establish a connection to the single IP address and the port of the single IP address;

means for establishing a routing table entry corresponding to the current actual target stack responsive to receiving a request to establish a connection to the single IP address and the port so as to define a routing path associated with the IP address and the port from the routing communication protocol stack to the current actual target stack; and means for routing communications for the connection to the port of the IP address received by the routing communication protocol stack based on the routing table.

14. A system according to claim 13, wherein the means for defining ones of the plurality of communication protocol stacks which are associated with the single IP address as candidate target communication protocol stacks comprises means for defining all of the plurality of communication protocol stacks of the cluster of data processing systems as candidate target communication protocol stacks.

15. A system according to claim 13, wherein the means for defining ones of the plurality of communication protocol stacks which are associated with the single IP address as candidate target communication protocol stacks comprises means for defining enumerated ones of the plurality of communication protocol stacks of the cluster of data processing systems as candidate target communication protocol stacks.

16. A system according to claim 13, wherein the means for establishing a first of the plurality of communication protocol stacks as a routing communication protocol stack associated with the single IP address comprises means for establishing a first of the plurality of communication protocol stacks as a routing communication protocol stack associated with the single IP address for routing communications associated with at least one specified port associated with the IP address;

wherein the means for defining ones of the plurality of communication protocol stacks which are associated with the single IP address as candidate target communication protocol stacks comprises means for defining ones of the plurality of communication protocol stacks which are associated with the at least one specified port associated with the IP address as candidate target communication protocol stacks;

wherein the means for defining ones of the plurality of communication protocol stacks which are associated with the single IP address as candidate target communication protocol stacks comprises means for distributing among the plurality of communication protocol stacks an identification of protocol stacks which are associated with the at least one port of the single IP address as candidate target communication protocol stacks and an identification of the routing communication protocol stack; and wherein the means for notifying the routing communication protocol stack when an instance of the plurality of application instances associated with a candidate target communication protocol stack listens to a port of the single IP address so as to define the candidate target communication protocol stack as a current actual target stack comprises means for notifying the routing communication protocol stack when an instance of the plurality of application instances associated with a candidate target communication protocol stack listens to the at least one port of the single IP address so as to define a current actual target stack.

17. A system according to claim 16, wherein the at least one port comprises a plurality of ports identified in a port list associated with the single IP address.

18. A system according to claim 16, wherein the at least one port comprises all ports associated with the single IP address.

19. A system according to claim 13, further comprising:

means for notifying the routing communication protocol stack that the instance of the plurality of application instances associated with the candidate target communication protocol stack has terminated listening to the port of the single IP address; and means for removing the routing table entry corresponding to the candidate target communication protocol stack so as to remove the routing path associated with the IP address, the port and the candidate target communication protocol stack.

20. A system according to claim 19, wherein the means for notifying the routing communication protocol stack that the instance of the plurality of application instances associated with the candidate target communication protocol stack has terminated listening to the port of the single IP address comprises means for sending a termination message through a cross coupling facility of the cluster of data processing systems.

21. A system according to claim 13, wherein the means for establishing a first of the plurality of communication protocol stacks as a routing communication protocol stack associated with the single IP address and the means for defining ones of the plurality of communication protocol stacks which are associated with the single IP address comprise means for incorporating a VIPADISTribute statement in a VIPADynamic definition block associated with the first communication protocol stack, wherein the VIPADISTribute statement defines an IP address as a dynamic routable virtual IP address (VIPA), identifies ports associated with the VIPA which are routable, and identifies communication protocols stacks associated with the VIPA.

22. A system according to claim 21, wherein the means for distributing among the plurality of communication protocol stacks an identification of protocol stacks which are associated with the single IP address and an identification of the routing communication protocol stack comprises means for broadcasting a list including the definitions of the VIPADISTRibute statement.

23. A system according to claim 13, further comprising:

means for notifying the routing communication protocol stack that a connection utilizing the single IP address and the port of the singe IP address has terminated; and means for removing the routing table entry corresponding to the connection to the current actual target stack so as to remove the routing path associated with the IP address, the port and the current actual target stack.

24. A system according to claim 13, further comprising means for selecting a current actual target stack so as to provide a selected communication protocol stack associated with the connection request; and wherein the means for establishing a routing table entry corresponding to the current actual target stack responsive to receiving a request to establish a connection to the single IP address and the port so as to define a routing path associated with the IP address and the port from the routing communication protocol stack to the current actual target stack comprises means for establishing a routing table entry corresponding to the selected communication protocol stack associated with the connection request to provide a routing path associated with the IP address and the port from the routing communication protocol stack to the selected communication protocol stack.

25. A computer program product for communicating with a plurality of application instances executing on a cluster of data processing systems having a plurality of communication protocol stacks associated therewith utilizing a single Internet Protocol (IP) address, comprising:
- a computer readable storage medium having computer readable program code embodied therein, the computer readable program code comprising:
- computer readable program code which establishes a first of the plurality of communication protocol stacks as a routing communication protocol stack associated with the single IP address;
- computer readable program code which defines ones of the plurality of communication protocol stacks which are associated with the single IP address as candidate target communication protocol stacks;
- computer readable program code which distributes among the plurality of communication protocol stacks an identification of protocol stacks which are associated with the single IP address and an identification of the routing communication protocol stack;
- computer readable program code which notifies the routing communication protocol stack when an instance of the plurality of application instances associated with a candidate target communication protocol stack listens to a port of the single IP address so as to define the candidate target communication protocol stack as a current actual target stack;
- computer readable program code which receives a request to establish a connection to the single IP address and the port of the single IP address;
- computer readable program code which establishes a routing table entry corresponding to the current actual target stack responsive to receiving a request to establish a connection to the single IP address and the port so as to define a routing path associated with the IP address and the port from the routing communication protocol stack to the current actual target stack; and
- computer readable program code which routes communications for the connection to the port of the IP address received by the routing communication protocol stack based on the routing table.

26. A computer program product according to claim 25, wherein the computer readable program code which defines ones of the plurality of communication protocol stacks which are associated with the single IP address as candidate target communication protocol stacks comprises computer readable program code which defines all of the plurality of communication protocol stacks of the cluster of data processing systems as candidate target communication protocol stacks.

27. A computer program product according to claim 25, wherein the computer readable program code which defines ones of the plurality of communication protocol stacks which are associated with the single IP address as candidate target communication protocol stacks comprises computer readable program code which defines enumerated ones of the plurality of communication protocol stacks of the cluster of data processing systems as candidate target communication protocol stacks.

28. A computer program product according to claim 25, wherein the computer readable program code which establishes a first of the plurality of communication protocol stacks as a routing communication protocol stack associated with the single IP address comprises computer readable program code which establishes a first of the plurality of communication protocol stacks as a routing communication protocol stack associated with the single IP address for routing communications associated with at least one specified port associated with the IP address;
- wherein the computer readable program code which defines ones of the plurality of communication protocol stacks which are associated with the single IP address as candidate target communication protocol stacks comprises computer readable program code which defines ones of the plurality of communication protocol stacks which are associated with the at least one specified port associated with the IP address as candidate target communication protocol stacks;
- wherein the computer readable program code which defines ones of the plurality of communication protocol stacks which are associated with the single IP address as candidate target communication protocol stacks comprises computer readable program code which distributes among the plurality of communication protocol stacks an identification of protocol stacks which are associated with the at least one port of the single IP address as candidate target communication protocol stacks and an identification of the routing communication protocol stack; and
- wherein the computer readable program code which notifies the routing communication protocol stack when an instance of the plurality of application instances associated with a candidate target communication protocol stack listens to a port of the single IP address so as to define the candidate target communication protocol stack as a current actual target stack comprises computer readable program code which notifies the routing communication protocol stack when an instance of the plurality of application instances associated with a candidate target communication protocol stack listens to the at least one port of the single IP address so as to define a current actual target stack.

29. A computer program product according to claim 28, wherein the at least one port comprises a plurality of ports identified in a port list associated with the single IP address.

30. A computer program product according to claim 28, wherein the at least one port comprises all ports associated with the single IP address.

31. A computer program product according to claim 25, further comprising:
- computer readable program code which notifies the routing communication protocol stack that the instance of the plurality of application instances associated with the candidate target communication protocol stack has terminated listening to the port of the single IP address; and
- computer readable program code which removes the routing table entry corresponding to the candidate target communication protocol stack so as to remove the routing path associated with the IP address, the port and the candidate target communication protocol stack.

32. A computer program product according to claim 31, wherein the computer readable program code which notifies the routing communication protocol stack that the instance of the plurality of application instances associated with the candidate target communication protocol stack has terminated listening to the port of the single IP address comprises computer readable program code which sends a termination message through a cross coupling facility of the cluster of data processing systems.

33. A computer program product according to claim 25, wherein the computer readable program code which establishes a first of the plurality of communication protocol stacks as a routing communication protocol stack associated with the single IP address and the computer readable program code which defines ones of the plurality of communication protocol stacks which are associated with the single IP address comprise means for incorporating a VIPADISTribute statement in a VIPADynamic definition block associated with the first communication protocol stack, wherein the VIPADISTribute statement defines an IP address as a dynamic routable virtual IP address (VIPA), identifies ports associated with the VIPA which are routable, and identifies communication protocols stacks associated with the VIPA.

34. A computer program product according to claim 33, wherein the computer readable program code which distributes among the plurality of communication protocol stacks an identification of protocol stacks which are associated with the single IP address and an identification of the routing communication protocol stack comprises computer readable program code which broadcasts a list including the definitions of the VIPADISTRibute statement.

35. A computer program product according to claim 25, further comprising:

computer readable program code which notifies the routing communication protocol stack that a connection utilizing the single IP address and the port of the singe IP address has terminated; and computer readable program code which removes the routing table entry corresponding to the connection to the current actual target stack so as to remove the routing path associated with the IP address, the port and the current actual target stack.

36. A computer program product according to claim 25, further comprising computer readable program code which selects a current actual target stack so as to provide a selected communication protocol stack associated with the connection request; and wherein the computer readable program code which establishes a routing table entry corresponding to the current actual target stack responsive to receiving a request to establish a connection to the single IP address and the port so as to define a routing path associated with the IP address and the port from the routing communication protocol stack to the current actual target stack comprises computer readable program code which establishes a routing table entry corresponding to the selected communication protocol stack associated with the connection request to provide a routing path associated with the IP address and the port from the routing communication protocol stack to the selected communication protocol stack.

* * * * *